United States Patent
Kawaguchi

(10) Patent No.: US 8,402,214 B2
(45) Date of Patent: Mar. 19, 2013

(54) DYNAMIC PAGE REALLOCATION STORAGE SYSTEM MANAGEMENT

(75) Inventor: Tomohiro Kawaguchi, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 678 days.

(21) Appl. No.: 12/560,740

(22) Filed: Sep. 16, 2009

(65) Prior Publication Data

US 2011/0066802 A1 Mar. 17, 2011

(51) Int. Cl.
*G06F 12/00* (2006.01)
(52) U.S. Cl. .............. 711/114; 711/170; 711/E12.002
(58) Field of Classification Search .............. 711/114, 711/170
See application file for complete search history.

(56) References Cited

U.S. PATENT DOCUMENTS

| 7,434,017 | B2 * | 10/2008 | Maruyama et al. ........... 711/165 |
| 2006/0143418 | A1 | 6/2006 | Takahashi et al. |
| 2007/0055713 | A1 | 3/2007 | Nagai et al. |
| 2007/0192560 | A1 | 8/2007 | Furuhashi |
| 2008/0184000 | A1 | 7/2008 | Kawaguchi |
| 2009/0276588 | A1 * | 11/2009 | Murase ......................... 711/160 |
| 2010/0281230 | A1 * | 11/2010 | Rabii et al. .................... 711/165 |

OTHER PUBLICATIONS

Hewlett-Packard Company et al.: "Thin provisioning with native hierarchical storage management", Research Disclosure, Mason Publications, Hampshire, GB, vol. 531, No. 66, Jul. 1, 2008, p. 650.

* cited by examiner

*Primary Examiner* — Charles Rones
*Assistant Examiner* — Aracelis Ruiz
(74) *Attorney, Agent, or Firm* — Mattingly & Malur, PC

(57) ABSTRACT

In one embodiment, a storage system for storage management in a tiered storage environment comprises a plurality of storage volumes in a pool which are divided into a plurality of tiers having different tier levels, the tiers being organized according to a tier configuration rule, the plurality of storage volumes provided by a plurality of physical storage devices in the storage system; and a controller controlling the plurality of physical storage devices, the controller including a processor and a memory. The controller changes tier configurations of the tiers of storage volumes when the tier configuration rule is changed, the tier configurations including the tier levels. The controller allocates the pool to a plurality of virtual volumes based on a change of tier levels against the physical storage devices which occurs when the pool does not meet the tier configuration rule that was in effect.

18 Claims, 60 Drawing Sheets

112-11-3

112-11-3-1　112-11-3-2　112-11-3-3

| Disk# | RAID Gr. # | Model |
|---|---|---|
| 0 | 0 | 1234-5678 |
| 1 | 0 | 1234-5678 |
| 2 | 0 | 1234-5678 |
| 3 | 0 | 1234-5678 |
| 4 | 1 | AB-CDEF-GHI-1 |
| 5 | 1 | AB-CDEF-GHI-1 |
| 6 | 1 | AB-CDEF-GHI-1 |
| 7 | 1 | AB-CDEF-GHI-1 |

Disk Management Table

*FIG. 3*

| | 112-11-4-1 | 112-11-4-2 | 112-11-4-3 | 112-11-4-4 | 112-11-4-5 | 112-11-4-6 | 112-11-4-7 |
|---|---|---|---|---|---|---|---|
| 112-11-4 | Model | Disk Type | RPM | Cell Type | Interface | Platter Capacity | Physical Capacity |
| | 1234-5678 | Flash SSD | - | SLC | SAS | - | 150[GB] |
| | 1234-5679 | Flash SSD | - | MLC | SATA | - | 300[GB] |
| | Alpha-111-222 | Flash SSD | - | SLC | SAS | - | 300[GB] |
| | Beta-111-222 | Flash SSD | - | MLC | SAS | - | 300[GB] |
| | ABC-DEF-GHI-1 | HDD | 7200 | - | SATA | 250[GB] | 1000[GB] |
| | ABC-DEF-GHI-2 | HDD | 10000 | - | SAS | 150[GB] | 300[GB] |
| | ABC-DEF-GHI-3 | HDD | 15000 | - | SAS | 150[GB] | 300[GB] |
| | ZZZ-XXX-YYY | HDD | 15000 | - | SAS | 150[GB] | 300[GB] |

Disk Information Table

FIG. 4

| RAID Gr. # | RAID Lv | Disk# | Capacity | Tier# | Access Counter | Free Chunk Queue Index | Used Chunk Queue Index |
|---|---|---|---|---|---|---|---|
| 0 | 5 | 0-3 | 900[GB] | 0 | 3465 | 1 | 8 |
| 1 | 5 | 4-7 | 3000[GB] | 2 | 7634 | 7 | 15 |
| 2 | 5 | 8-11 | 3000[GB] | 2 | 1788 | 2 | 3 |
| 3 | NULL | NULL | 0[GB] | NULL | NULL | NULL | NULL |
| 4 | NULL | NULL | 0[GB] | NULL | NULL | NULL | NULL |
| 5 | NULL | NULL | 0[GB] | NULL | NULL | NULL | NULL |
| 6 | 10 | 64-67 | 1500[GB] | 1 | 2828 | 31 | 22 |
| 7 | 10 | 68-72 | 1500[GB] | 1 | 902 | 14 | 8 |

RAID Group Management Table

Virtual Volume Management Table (112-11-2)

| Vol# (112-11-2-1) | Capacity (112-11-2-2) | RAID Gr. # (112-11-2-3) | Chunk# (112-11-2-5) | Tier# (112-11-2-6) |
|---|---|---|---|---|
| 0 | 10[GB] | 1 | 23 | 1 |
| 1 | 30[GB] | 0 | 11 | 1, 2 |
| 2 | 20[GB] | 1 | 71 | 3 |
| 3 | 60[GB] | 7 | 3 | all |
| 4 | N/A | N/A | N/A | N/A |
| 5 | 60[GB] | 2 | 1 | 2 |
| 6 | N/A | N/A | N/A | N/A |
| 7 | N/A | N/A | N/A | N/A |

| 112-11-5-1 | 112-11-5-2 | 112-11-5-3 | 112-11-5-4 | 112-11-5-5 |
|---|---|---|---|---|
| Tier# | Total Capacity | Used Capacity | RAID Gr. # | Configuration Rule |
| 0 | 10000[GB] | 8000[GB] | 0, 1, 8 | Flash SSD, SAS, and SLC (reserve 20%) |
| 1 | 30000[GB] | 23000[GB] | 2, 11, 13 | HDD, SAS and 10Krpm and max 12 disks |
| 2 | 80000[GB] | 200[GB] | 16, 18 | HDD, SAS and 10Krpm or 15Krpm |
| 3 | 80000[GB] | 200[GB] | 7, 19, 20, 22 | HDD, SATA, 7200rpm and min 12 disks |
| 4 | 60000[GB] | 500[GB] | 9, 10, 12, 14, 15 | HDD, SATA, 7200rpm and max 20 disks |
| 5 | 2000[GB] | 0[GB] | 17, 21 | Other than listed above |
| 6 | NULL | NULL | NULL | NULL |
| 7 | NULL | NULL | NULL | NULL |

Tier Management Table

FIG. 7

| Top LBA Addr. of Virtual Vol. Page | RAID Gr. # | Top LBA Addr. of Capacity Pool Page | I/O Counter | Counter Cleared Time |
|---|---|---|---|---|
| 0x0000 | 10 | 0x4000 | 53 | May 1, 2011 |
| 0x0100 | 14 | 0x0200 | 699 | May 1, 2011 |
| 0x0200 | 18 | 0x0000 | 0 | May 1, 2011 |
| 0x0300 | N/A | N/A | N/A | May 1, 2011 |
| 0x0400 | 10 | 0x3200 | 72 | May 1, 2011 |
| 0x0500 | 18 | 0x0200 | 3 | May 1, 2011 |
| 0x0600 | 10 | 0x1000 | 93 | May 1, 2011 |

Virtual Volume Page Management Table

FIG. 8

| Capacity Pool Chunk# | Virtual Volume# | Used Capacity | Deleted Capacity | Prev. Chunk Pointer | Next Chunk Pointer |
|---|---|---|---|---|---|
| 0 | 2 | 0 | 0kB | 7 | 2 |
| 1 | 10 | 2048kB | 1024kB | 2 | 3 |
| 2 | 5 | 8192kB | 768kB | 0 | 1 |
| 3 | 7 | 4096kB | 0kB | 1 | Null |
| 4 | N/A | 0 | 0 | 21 | 31 |

Capacity Pool Chunk Management Table

Capacity Pool Page Management Table 112-11-8

| Capacity Pool Page Index | Virtual Volume Page# |
|---|---|
| 0 | 10 |
| 1 | 27 |
| 2 | NULL |
| 3 | 13 |

112-11-8-1, 112-11-8-2

| Cache Slot# | Volume# | LBA | Next | I/O Counter |
|---|---|---|---|---|
| 0 | 2 | 0xA00 | 1 | 34 |
| 1 | 1 | 0x7E000 | 2 | 163 |
| 2 | 1 | 0x9700 | 3 | 812 |
| 3 | 0 | 0x0000 | NULL | 55 |
| 4 | 2 | 0xC500 | 5 | 734 |
| 5 | 1 | 0x1100 | 6 | 23 |
| 6 | 1 | 0xFF00 | NULL | 45 |

| Kind of Queue | Pointer |
|---|---|
| Free | 2 |
| Clean | 1 |
| Dirty | 4 |

Cache Management Table

| RAID Gr. # | RAID Lv. | Disk# | Capacity | Tier# | Access Counter | Free Chunk Queue Index | Used Chunk Queue Index |
|---|---|---|---|---|---|---|---|
| 0 | 5 | 0-3 | 900[GB] | 0 | 3465 | 1 | 8 |
|   |   |   | 0[GB] | 1 |   | NULL | NULL |
|   |   |   | 0[GB] | 2 |   | NULL | NULL |
|   |   |   | 0[GB] | 3 |   | NULL | NULL |
| 1 | 5 | 4-7 | 900[GB] | 0 | 7634 | 7 | 15 |
|   |   |   | 2100[GB] | 1 |   | 130 | 143 |
|   |   |   | 0[GB] | 2 |   | NULL | NULL |
|   |   |   | 0[GB] | 3 |   | NULL | NULL |

RAID Group Management Table

| Tier# | Total Capacity | Used Capacity | RAID Gr. # | Configuration Rule |
|---|---|---|---|---|
| 0 | 10000[GB] | 8000[GB] | 0, 1, 8 | Flash SSD, SAS, and SLC (reserve 20%) |
| 1 | 30000[GB] | 23000[GB] | 2, 11, 13 | HDD, SAS and 10Krpm (outer 30%) |
| 2 | 80000[GB] | 200[GB] | 2, 11, 13, 16, 18 | HDD, SAS and 10Krpm(inner 70%) or 15Krpm |
| 3 | 80000[GB] | 200[GB] | 7, 19, 20, 22 | HDD, SATA, 7200rpm and min 12 disks |
| 4 | 60000[GB] | 500[GB] | 9, 10, 12, 14, 15 | HDD, SATA, 7200rpm and max 20 disks |
| 5 | 2000[GB] | 0[GB] | 17, 21 | Other than listed above |
| 6 | NULL | NULL | NULL | NULL |
| 7 | NULL | NULL | NULL | NULL |

Tier Management Table

Virtual Volume Management Table

| Vol# | Capacity | Address Range | RAID Gr. # | Chunk# | Tier# |
|---|---|---|---|---|---|
| 0 | 10[GB] | 0x0000-0x5fff | 1 | 23 | 1 |
| | | 0x6000-0x6fff | 13 | 26 | 2 |
| | | 0x7000-0x9fff | 16 | 7 | 3 |
| | | Other than listed above | 7 | 88 | 4 |
| 1 | 30[GB] | 0x1000-0x10ff | 0 | 11 | 1,2 |
| | | 0x2000-0x20ff | 16 | 42 | 2 |
| | | 0x3000-0x30ff | 18 | 45 | 2 |
| | | Other than listed above | 17 | 76 | 5 |

FIG. 53

Application Management Table (512-1)

| Application# (512-1-1) | Host# (512-1-2) | Volume# (512-1-3) | LBA Range of Data (512-1-4) |
|---|---|---|---|
| 0 | 0 | 1 | 0x0000-0x7fff |
| 1 | 0 | 1 | 0x8000-0xffff |
| 2 | 0 | 2 | 0x1000-0x17ff |
| 3 | 0 | 2 | 0x3000-0x37ff |
| 4 | 1 | 3 | 0x0000-0x00ff, 0x2000-0x20ff |
| 5 | 1 | 3 | 0x7000-0x71ff |
| 6 | NULL | NULL | NULL |
| 7 | NULL | NULL | NULL |

FIG. 56

Virtual Volume Management Table

| Vol# | Capacity | Tier# | RAID Gr. # | Chunk# | Transaction Condition |
|---|---|---|---|---|---|
| 0 | 10[GB] | 1 | 1 | 23 | Above 10K io /week |
|   |   | 2 | 13 | 26 | 10K-2K io /week |
|   |   | 3 | N/A | N/A | N/A |
|   |   | 4 | 7 | 88 | Under 2K io /week |
| 1 | 30[GB] | 1 | 0 | 11 | Above 30K io/week |
|   |   | 2 | 16 | 42 | 30K-5K io/week |
|   |   | 3 | 18 | 45 | 5K-1K io/week |
|   |   | 4 | 17 | 76 | Under 1K io/week |

112-11-2-1, 112-11-2-2, 112-11-2-6, 112-11-2-3, 112-11-2-5, 112-11-2-8

112-11-2

$$y = L(x)$$

$$x_j = \frac{\sum_{i=0}^{j-1}(T_i)}{\sum_{i=0}^{N-1}(T_i)}$$

$$y_j = \frac{j}{N}$$

- $L(x)$ : Lorenz Curve (cumulative distribution function)
- $y_j = L(x_j)$ : rate of capacity which $x_j$ of transaction have.
- $x_j$ : rate of transaction
- $N$ : total number of allocated pages
- $i, j$ : ID of page ($0 \leq i < N-1, 0 \leq i < N-1$)
- $T_i$ : transaction of page $i$ ($T_0 \geq T_1 \geq T_2 \geq \cdots \geq T_{N-1}$)

DYNAMIC PAGE REALLOCATION STORAGE SYSTEM MANAGEMENT

BACKGROUND OF THE INVENTION

The present invention relates generally to management and configuration of tiered storage systems and, more particularly, to methods and apparatus for dynamic page reallocation storage system management.

Storage system can use several types of disks including, for example, SSD (Solid State Disk), SAS (Serial Attached) HDD, and SATA (Serial ATA) HDD. These disks are different in performance, capacity, reliability, and cost. When the storage user acquires a storage volume, the user chooses from the various types of disks pursuant to the purpose and requirement to maximize the ROI (return on investment). The purpose and requirement may vary with time. In that case, there will be a need to tune the disk configuration for optimization. One approach is to use tiered storage management to maintain a high ROI. Additionally, there may be a need to tune the tiered storage configuration dynamically to keep a maximized ROI, because it is difficult to design the pool configuration.

There are existing technologies for managing a tiered storage environment. For example, US20070055713A1 discloses a volume capacity provisioning method, according to which a storage system selects suitable disks depending on that use and the required performance when a volume requires expanding capacity. US20080184000A1 discloses a thin provisioning (sliced by pages) volume migration method between a plurality of tiers in one pool. A storage system selects a low access volume and seamlessly migrates it to a low ratency tier in another storage module. US20070192560A1 discloses a disk installation controlling method for thin provisioning pool, according to which a storage system installs disks to a suitable pool depending on the system configurations. US20070055713A1 and US20070192560A1 are useful for the tuning of volume tier configuration. US20080184000A1 is useful for capacity installation for a tier. These disclosures are incorporated herein by reference.

BRIEF SUMMARY OF THE INVENTION

Embodiments of the invention provide methods and apparatus for dynamic page reallocation storage system management. When the storage user manages storage in a tiered storage environment, it is difficult to design the pool configuration. The storage shows the tier load and the user tunes the tier configuration with the tier load. The tier configuration can change dynamically. This invention provides a technique whereby the storage indicates the current tier load, the storage user can change the tier configuration rule, and the storage can reconfigurate the tier configuration according to the tier configuration rule set by the storage user. In this way, the storage system can dynamically change the tier configuration based on input from the storage user according to the actual tier load.

In accordance with an aspect of the present invention, a storage system for storage management in a tiered storage environment comprises a plurality of storage volumes in a pool which are divided into a plurality of tiers having different tier levels, the tiers being organized according to a tier configuration rule, the plurality of storage volumes provided by a plurality of physical storage devices in the storage system; and a controller controlling the plurality of physical storage devices, the controller including a processor and a memory. The controller changes tier configurations of the tiers of storage volumes when the tier configuration rule is changed, the tier configurations including the tier levels. The controller allocates the pool to a plurality of virtual volumes based on a change of tier levels against the physical storage devices which occurs when the pool does not meet the tier configuration rule that was in effect.

In some embodiments, each tier in the pool includes one or more RAID groups of the physical storage devices. The plurality of physical storage devices are arranged into a plurality of RAID groups in the pool which are divided into the plurality of tiers, and at least one RAID group in the pool includes physical storage devices that are split among two or more of the plurality of tiers. The controller allocates the pool to the plurality of virtual volumes based on a change of tier levels against the physical storage devices in response to an input from a management terminal when the pool does not meet the tier configuration rule that was in effect. The pool includes a plurality of thin provisioning pools; and the controller receives an input to allocate two or more of the thin provisioning pools to one virtual volume and merges the two or more thin provisioning pools into a consolidated thin provisioning pool to be allocated to the one virtual volume. At least one virtual volume of the plurality of virtual volumes has one or more designated areas that are capable of setting the tier level therein in accordance with changing tier configurations by the controller. The controller allocates the pool to the plurality of virtual volumes based on a change of tier levels against the physical storage devices which occurs automatically without external input when the pool does not meet the tier configuration rule that was in effect. The controller monitors a tier load of the storage system, and allocates the pool to the plurality of virtual volumes based on the change of tier levels against the physical storage devices as determined based on the tier load of the storage system.

In accordance with another aspect of the invention, a storage system for storage management in a tiered storage environment comprises a plurality of storage volumes in a pool which are divided into a plurality of tiers having different tier levels, each tier being organized according to a tier configuration rule, the plurality of storage volumes provided by a plurality of physical storage devices in the storage system; and a controller controlling the plurality of physical storage devices, the controller including a processor and a memory. The controller changes tier configurations of the tiers of storage volumes when the tier configuration rule is changed, the tier configurations including the tier levels. The controller dynamically allocates the pool to a plurality of virtual volumes based on a change of tier levels against the physical storage devices. The plurality of physical storage devices are arranged into a plurality of RAID groups in the pool which are divided into the plurality of tiers. At least one RAID group in the pool includes physical storage devices that are split among two or more of the plurality of tiers.

In accordance with another aspect of the invention, a storage system for storage management in a tiered storage environment comprises a plurality of storage volumes in a pool which are divided into a plurality of tiers having different tier levels, each tier being organized according to a tier configuration rule, the plurality of storage volumes provided by a plurality of physical storage devices in the storage system; and a controller controlling the plurality of physical storage devices, the controller including a processor and a memory. The controller changes tier configurations of the tiers of storage volumes when the tier configuration rule is changed, the tier configurations including the tier levels. The controller allocates the pool to a plurality of virtual volumes based on the tier configuration rule and characteristics of the virtual volumes. The pool includes a plurality of thin provisioning pools. The controller receives an input to allocate two or more of the thin provisioning pools to one virtual volume and merges the two or more thin provisioning pools into a consolidated thin provisioning pool to be allocated to the one virtual volume.

These and other features and advantages of the present invention will become apparent to those of ordinary skill in the art in view of the following detailed description of the specific embodiments.

BRIEF DESCRIPTION OF THE DRAWINGS

FIG. 3 illustrates an example of a Disk Management Table in the memory of FIG. 2.

FIG. 4 illustrates an example of a Disk Information Table in the memory of FIG. 2.

FIG. 5 illustrates an example of a RAID Group Management Table in the memory of FIG. 2.

FIG. 6 illustrates an example of a Virtual Volume Management Table in the memory of FIG. 2.

FIG. 7 illustrates an example of a Tier Management Table in the memory of FIG. 2.

FIG. 8 illustrates an example of a Virtual Volume Page Management Table in the memory of FIG. 2.

FIG. 9 illustrates an example of a Capacity Pool Chunk Management Table in the memory of FIG. 2.

FIG. 10 illustrates an example of a Capacity Pool Page Management Table in the memory of FIG. 2.

FIG. 11 illustrates an example of a Cache Management Table in the memory of FIG. 2.

FIG. 32 illustrates an example of a pool manager window showing the display and operation image of RAID group installation.

FIG. 45 illustrates an example of a RAID Group Management Table in the memory of FIG. 44 according to the second embodiment.

FIG. 46 illustrates an example of a Tier Management Table in the memory of FIG. 44 according to the second embodiment.

FIG. 51 illustrates an example of a Virtual Volume Management Table in the memory of FIG. 50 according to the third embodiment.

FIG. 53 illustrates an example of the Application Management Table in the memory of the management terminal of FIG. 49 according to the third embodiment.

FIG. 56 illustrates an example of a Virtual Volume Management Table in the memory of FIG. 55.

FIG. 59 shows the formulas to calculate the Lorenz Curve.

DETAILED DESCRIPTION OF THE INVENTION

Figure 1:
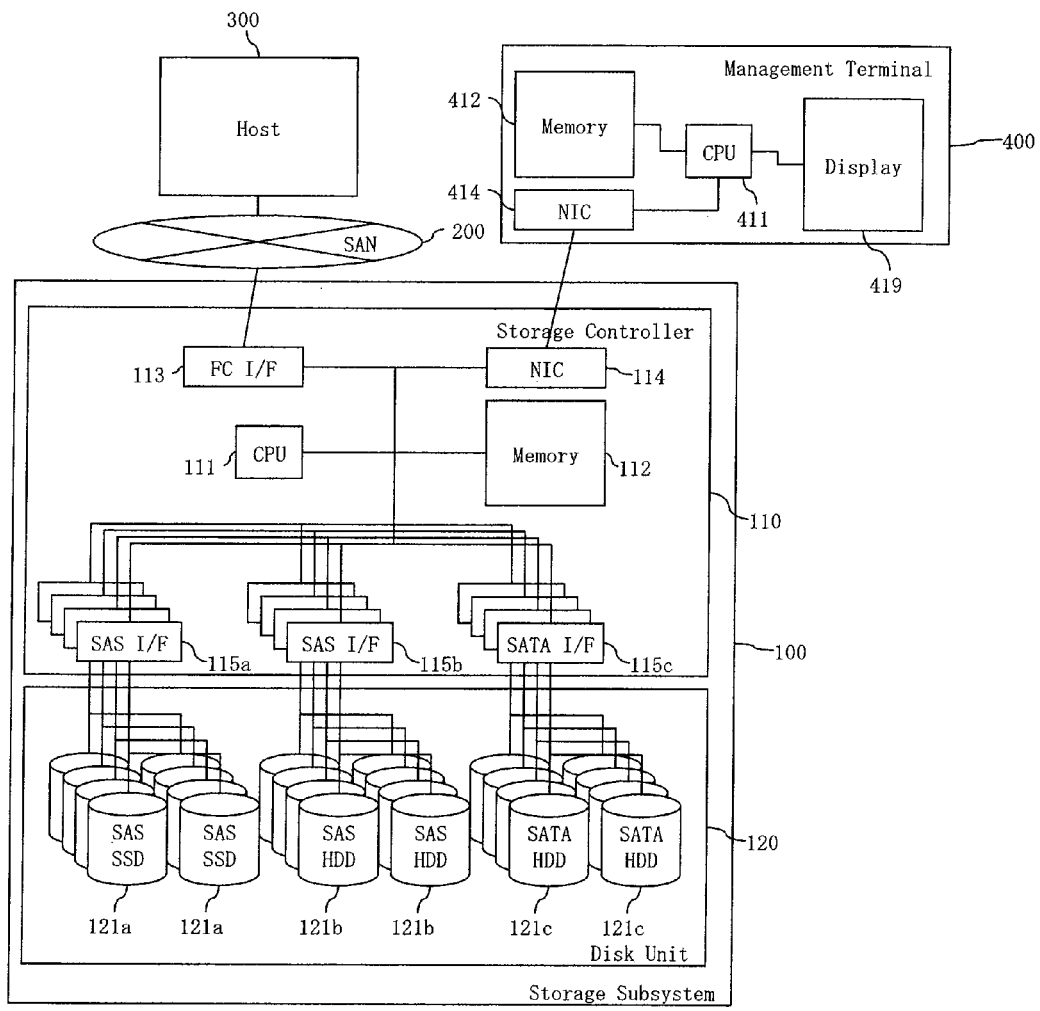
FIG. 1 illustrates the hardware configuration of a system in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Exemplary embodiments of the invention, as will be described in greater detail below, provide apparatuses, methods and computer programs for dynamic page reallocation storage system management.

First Embodiment

1. System Configuration

FIG. 1 illustrates the hardware configuration of a system in which the method and apparatus of the invention may be applied. A storage subsystem 100 for storing data is connected to a host computer 300 by a storage network. A storage management terminal 400 is connected to the storage subsystem 100.

The storage subsystem 100 includes a storage controller 110 that has a CPU 111, a memory 112, a storage interface 113, a local network interface 114, and disk interfaces 115 which may include SAS I/F and SATA I/F. The CPU 111 controls the storage subsystem 100, and reads programs and tables stored in the memory 112. The storage interface 113 connects with the host computer 300 via the storage network 200. The local network interface 114 connects with the storage management terminal 400. The disk interfaces 115 (115*a*, 115*b*, etc.) connects with disks 121. A disk unit 120 includes a plurality of disks 121 (121*a*, 121*b*, etc) for storing data, which may include SAS SSD (flash memory), SAS HDD, and SATA HDD.

The host computer 300 sends I/O requests to the storage subsystem 100 via the storage network 200, and sends and receives data from the storage subsystem 100 via the storage network 200.

The storage management terminal 400 shows availability/reliability information of the storage subsystem 100. The terminal 400 includes a CPU 411 which reads programs and tables stored in the memory 412. A local network interface 414 connects with the storage subsystem 100. A display 419 shows availability/reliability information of the storage subsystem 100.

Figure 2:
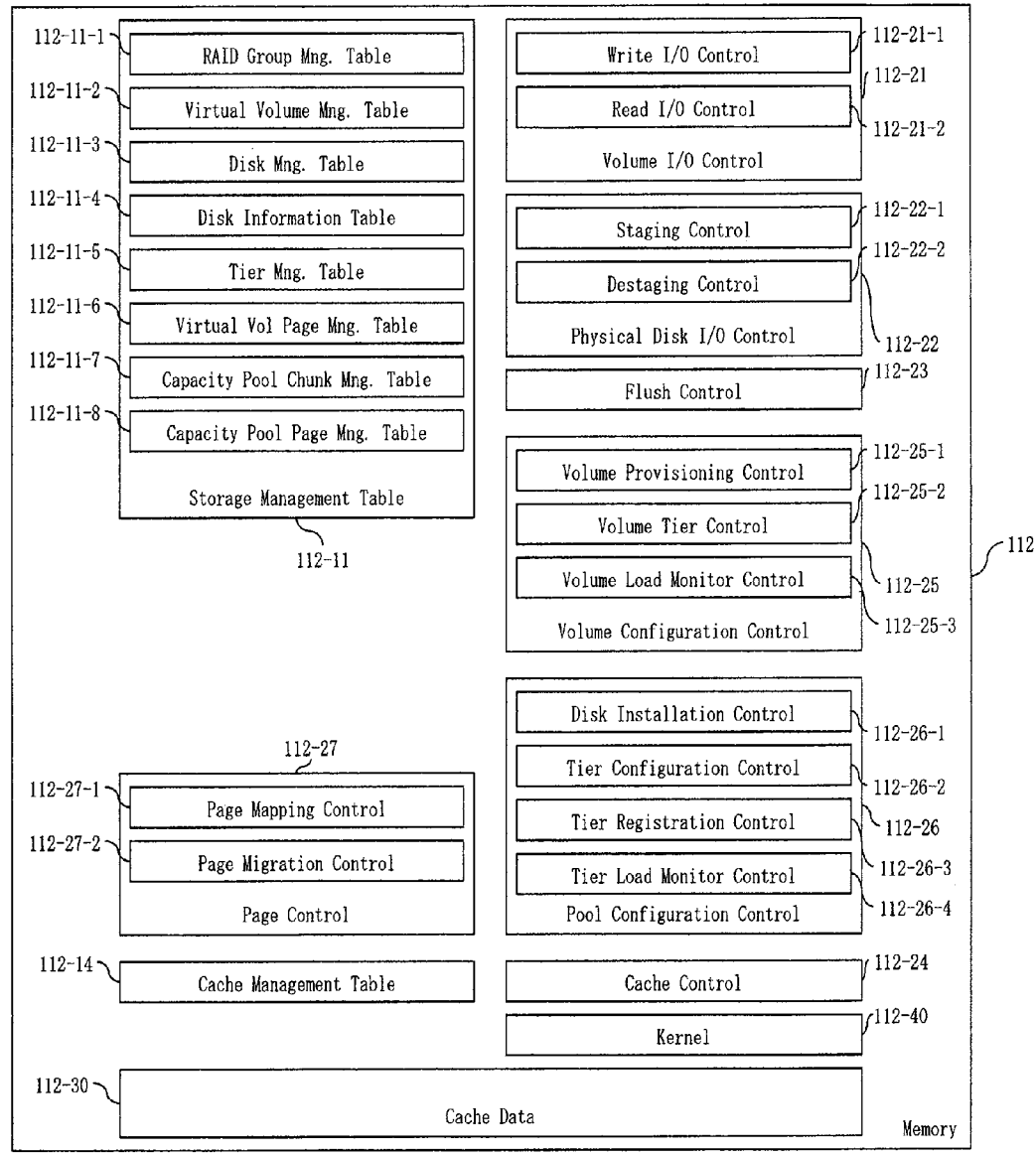
FIG. 2 illustrates an example of a memory in the storage subsystem of FIG. 1 according to a first embodiment of the invention.

FIG. 2 illustrates an example of the memory 112 in the storage subsystem 100 of FIG. 1 according to a first embodiment of the invention. A Storage Management Table 112-11 includes a RAID Group Management Table 112-11-1 (FIG. 5) for physical structure management for the disks 121 and those groups, a Virtual Volume Management Table 112-11-2 (FIG. 6) for volume configuration management, a Disk Management Table 112-11-3 (FIG. 3) for disk configuration management of the disks 121, a Disk Information Table 112-11-4 (FIG. 4) to provide a disk information database, a Tier Management Table 112-11-5 (FIG. 7) for capacity pool tier management wherein each capacity pool tier is organized according to the tier configuration rule (see Configuration Rule 112-11-5-5 in FIG. 7), a Virtual Volume Page Management Table 112-11-6 (FIG. 8) for reference management from a partition of a virtual volume to a partition of a capacity pool, a Capacity Pool Chunk Management Table 112-11-7 (FIG. 9) for resource management of a capacity pool and for reference management from a capacity pool page to a virtual volume page, and a Capacity Pool Page Management Table 112-11-8 (FIG. 10) for resource management of a capacity pool chunk. The memory 112 further includes a Cache Management Table 112-14 (FIG. 11) for managing a Cache Data Area 112-30 stored in the memory 112 and for LRU/MRU management.

Figure 17:
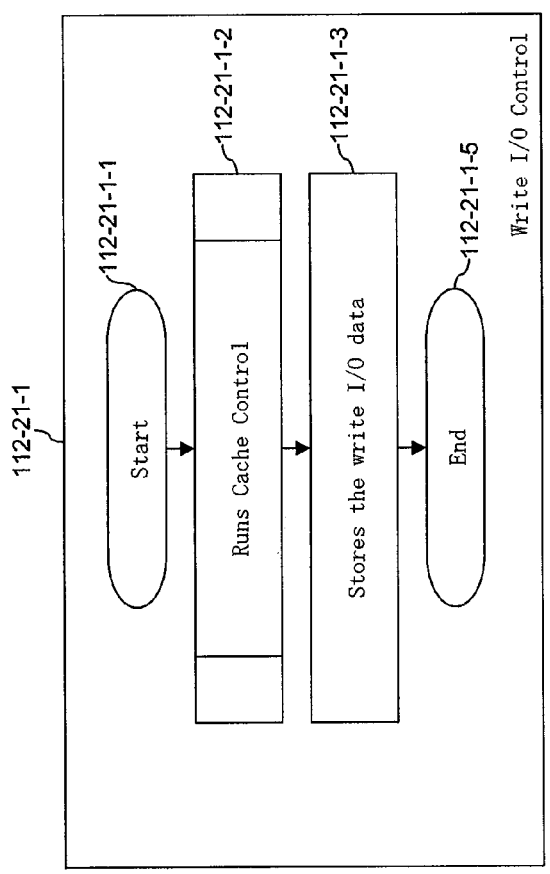
FIG. 17 illustrates an example of a process flow of the Write I/O Control in the memory of FIG. 2.
Figure 18:
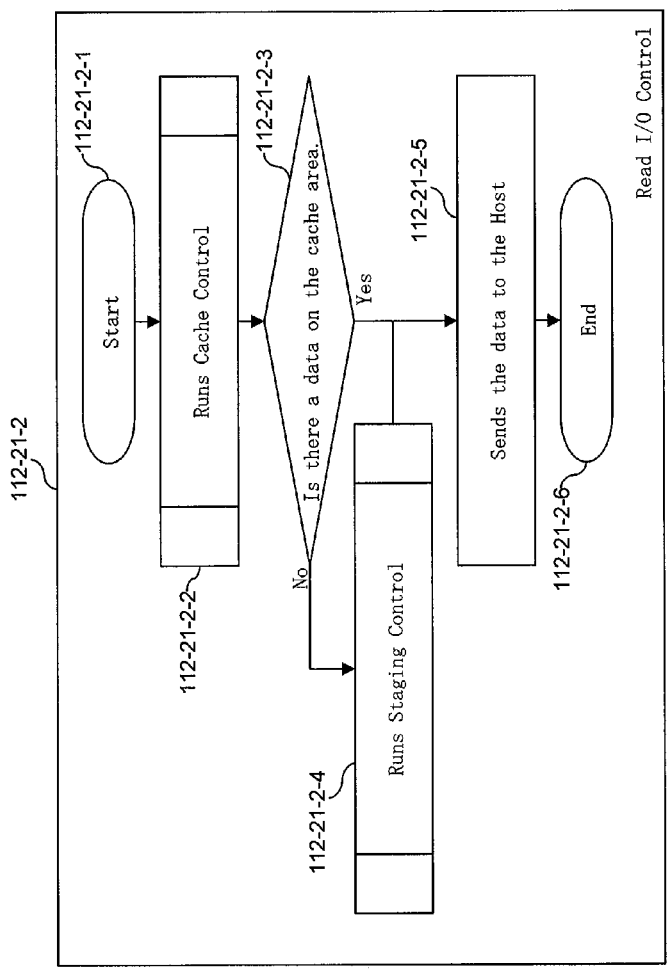
FIG. 18 illustrates an example of a process flow of the Read I/O Control in the memory of FIG. 2.

A Volume I/O Control 112-21 includes a Write I/O Control 112-21-1 (FIG. 17) and a Read I/O Control 112-21-2 (FIG. 18). The I/O Control 112-21-1 runs by a write I/O requirement, and receives write data and stores it to the Cache Data Area 112-30 via the channel interface 113. The Read I/O Control 112-21-2 runs by a read I/O requirement, and sends read data from the Cache Data Area 112-30 via the channel interface 113. A Physical Disk Control 112-22 includes a Staging Control 112-22-1 (FIG. 19) for transferring data from the disks 121 to the Cache Data Area 112-30, and a Destaging Control 112-22-2 (FIG. 20) for transferring data from the Cache Data Area 112-30 to the disks 121. A Flush Control 112-23 (FIG. 21) periodically flushes dirty data in the Cache Data Area 112-30 to the disks 121.

A Volume Configuration Control 112-25 includes a Volume Provisioning Control 112-25-1 (FIG. 23) for provisioning new virtual volumes, a Volume Tier Control 112-25-2 (FIG. 24) for changing configuration of volumes, and a Volume Load Monitor Control 112-25-3 (FIG. 25) for outputting virtual volume load status. A Pool Configuration Control 112-26 includes a Disk Installation Control 112-26-1 (FIG. 26) for installing new disks 121 and configuring a RAID group, a Tier Configuration Control 112-26-2 (FIG. 27) for changing tier configurations when the tier rule is changed, a Tier Registration Control 112-26-3 (FIG. 28) for registering capacity pool chunks to a tier according to the tier configuration (see Configuration Rule 112-11-5-5 in FIG. 7), and a Tier Load Monitor Control 112-26-4 (FIG. 29) for outputting tier load status. As known in the art, a tier load can be measured and calculated based on (i) the summation of load on each RAID group (or disk) in the tier and/or (ii) the maximum load on each RAID group (or disk) in the tier. The tier load is often expressed as "ms" or "msec" for average latency and "IOPS" for processable transaction. A Page Control 112-27 includes a Page Mapping Control 112-27-1 (FIG. 30) for allocating a new capacity pool page to a virtual volume page, or searching a capacity pool page to which a virtual page links, and a Page Migration Control 112-27-2 (FIG. 31) for copying a capacity pool page to another capacity pool page and changing the link between the virtual volume page and the capacity pool page. A Cache Control 112-28 (FIG. 22) finds cached data in the Cache Data Area 112-30, and allocates a new cache area in the Cache Data Area 112-30. A Kernel 112-40 controls the schedules of running program. The Cache Data Area 112-30 stores read and write cache data, and is separated into plural cache slots.

2. Table Structures

FIG. 3 illustrates an example of the Disk Management Table 112-11-3 in the memory 112 of FIG. 2. The Disk Management Table 112-11-3 includes columns of Disk Number 112-11-3-1 containing the ID of the disk 121, RAID Group Number 112-11-3-2 containing the ID of a RAID Group to which the Disk 121 belongs, and Model Information 112-11-3-3 containing the model number of the disk 121.

FIG. 4 illustrates an example of the Disk Information Table 112-11-4 in the memory 112 of FIG. 2. The Disk Information Table 112-11-4 has columns of Model Information 112-11-4-1 containing the model number of the disk model, Disk Type Information 112-11-4-2 containing the data-storing type of the disk model (e.g., HDD or SSD), RPM information 112-11-4-3 containing revolution per minute information of HDD (If the model is not HDD, this element stores "–"), Cell information 112-11-4-4 containing cell type information of SSD (If the model is not SSD, this element stores "–"), Interface Information 112-11-4-5 containing the interface type of the disk model, Platter Capacity Information 112-11-4-6 containing the capacity of a platter of the disk model (If the model is not HDD, this element stores "–"), and Physical Capacity Information 112-11-4-7 containing the capacity of the disk model.

FIG. 5 illustrates an example of the RAID Group Management Table 112-11-1 in the memory 112 of FIG. 2. The RAID Group Management Table 112-11-1 has columns of RAID Group Number 112-11-1-1 containing the ID of the RAID Group, and RAID Level 112-11-1-2 containing the structure of RAID Group. "N(=10, 5, 6, etc)" means "RAID Level is N." "N/A" means the RAID Group does not exist. The Table 112-11-1 further includes columns of Disk Number 112-11-1-3 containing the ID list of disks 121 belonging to the RAID Group, RAID Group Capacity 112-11-1-4 containing the total capacity of the RAID Group except the redundant area, Tier Number 112-11-1-5 containing the tier number to which the RAID Group belongs, Access Counter 112-11-1-6 containing the access counter to the RAID Group, Free Chunk Queue Index 112-11-1-7 containing the parameter for managing unused thin provisioning chunks, and Used Chunk Queue Index 112-11-1-8 containing the parameter for managing used thin provisioning chunks.

FIG. 6 illustrates an example of the Virtual Volume Management Table 112-11-2 in the memory 112 of FIG. 2. The Virtual Volume Management Table 112-11-2 has columns of Volume Number 112-11-2-1 containing the ID of the volume, Volume Capacity 112-11-2-2 containing the capacity of the volume ("N/A" means the volume does not exist), Using RAID Group Number 112-11-2-3 containing the RAID Group ID which the volume currently uses, Using Chunk Number 112-11-2-5 containing the Chunk ID that the virtual volume currently uses, and Tier Number 112-11-2-6 containing the Tier ID from which the virtual volume allocates a capacity pool page.

FIG. 7 illustrates an example of the Tier Management Table 112-11-5 in the memory 112 of FIG. 2. The Tier Management Table 112-11-5 has columns of Tier Number 112-11-5-1 containing the ID of the volume, Total Capacity 112-11-5-2 containing the total capacity of RAID groups in the tier, Used Capacity 112-11-5-3 containing the total used capacity pool page of the tier, RAID Group List 112-11-5-4 containing the RAID Group ID list in the tier, and Configuration Rule 112-11-5-5 containing the configuration rule for grouping the tier. The RAID groups in the tier match the configuration rule. The configuration rule is based on factors such as disk type, disk interface type, performance, RAID level, number of disks, etc.

FIG. 8 illustrates an example of the Virtual Volume Page Management Table 112-11-6 in the memory 112 of FIG. 2. The Virtual Volume Page Management Table 112-11-6 includes columns of Virtual Volume Page Index 112-11-6-1 containing the top address of the virtual volume page, RAID Group Number 112-11-6-2 containing the RAID Group ID to which the virtual volume page belongs ("N/A" means no capacity pool page is allocated to the virtual volume page), Capacity Pool Page Index 112-11-6-3 containing the top address of a capacity pool page to which the virtual volume page refers, I/O Counter 112-11-6-4 containing the access counter to disks in the virtual volume page, and Counter Cleared Time containing the start time of the access count.

FIG. 9 illustrates an example of the Capacity Pool Chunk Management Table 112-11-7 in the memory 112 of FIG. 2. The Capacity Pool Chunk Management Table 112-11-7 has columns of Capacity Pool Chunk Number 112-11-7-1 containing the ID of the capacity pool chunk, Virtual Volume Number 112-11-7-2 containing the ID of a virtual volume by which the capacity pool chunk is referred, Used Capacity 112-11-7-3 containing the used capacity of the capacity pool chunk, Deleted Capacity 112-11-7-4 containing the removed capacity of the capacity pool chunk once the area has been used, Previous Chunk Number 112-11-7-5 containing the previous chunk pointer for queue management ("NULL" means a head of the queue), and Next Chunk Number 112-11-7-6 containing the next chunk pointer for queue management ("NULL" means a terminal of the queue).

FIG. 10 illustrates an example of the Capacity Pool Page Management Table 112-11-8 in the memory 112 of FIG. 2. The Capacity Pool Page Management Table 112-11-8 includes columns of Capacity Pool Page Index 112-11-8-1 containing the ID of the capacity pool page ("N/A" would mean the capacity pool page is unused), and Virtual Volume Page Number 112-11-8-2 containing the ID of a virtual volume page by which the capacity pool page is referred. "NULL" means the capacity pool page is unused.

FIG. 11 illustrates an example of the Cache Management Table 112-14 in the memory 112 of FIG. 2. The Cache Management Table 112-14 has columns of Cache Slot Number 112-14-1 containing the ID of the cache slot in Cache Data Area 112-30, Volume Number 112-14-2 containing the ID of the volume (disk or virtual volume) in which the cache slot stores a data, Disk Address 112-14-3 containing the disk address (e.g., LBA) at which the cache slot stores the data, Next Slot Pointer 112-14-4 containing the next cache slot number for queue management ("NULL" means a terminal of the queue), and I/O Counter 112-14-7 containing the I/O counter for the cache slot. The column of Kind of Queue Information 112-14-5 contains the kind of cache slot queue. "Free" means a queue that has the unused cache slots. "Clean" means a queue which has cache slots that store the same data as the disk slots. "Dirty" means a queue which has cache slots that store different data from the data in the disk slots, indicating that the storage controller 110 needs to flush the cache slot data to the disk slot in the future. The column of Queue Index Pointer 112-14-6 contains the index of the cache slot queue.

3. Logical Structures

Figure 12:
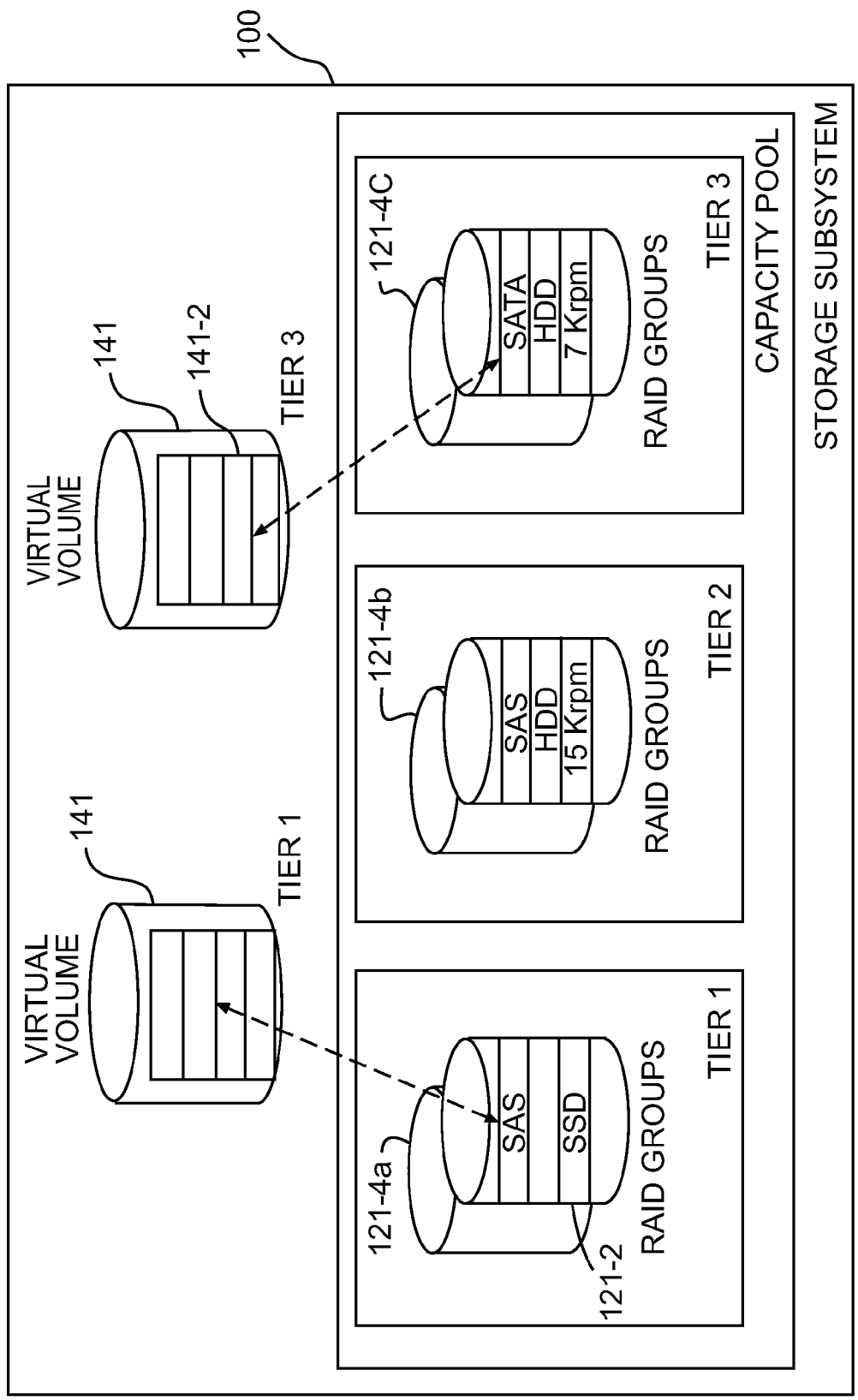
FIG. 12 illustrates a summary of the logical storage configuration of the storage subsystem according to the first embodiment.

FIG. 12 illustrates a summary of the logical storage configuration of the storage subsystem 100 according to the first embodiment. The storage subsystem 100 includes virtual volumes 141 which can be accessed by the host computer 300. Each virtual volume 141 has a plurality of virtual volume pages 141-2. Each virtual volume page 141-2 refers to a capacity pool page 121-2 of a capacity pool. The capacity pool has a plurality of RAID Groups 121-4. Each RAID group 121-4 contains a group of disks 121. The storage subsystem 100 has several types of RAID groups 121-4*a*, 121-4*b*, 121-4*c*, which are grouped or classified into tiers (Tier 1, Tier 2, Tier 3) based on the RAID group type. These tiers belong to the capacity pool. The virtual volumes 141 are likewise identified by the tiers.

Figure 13:
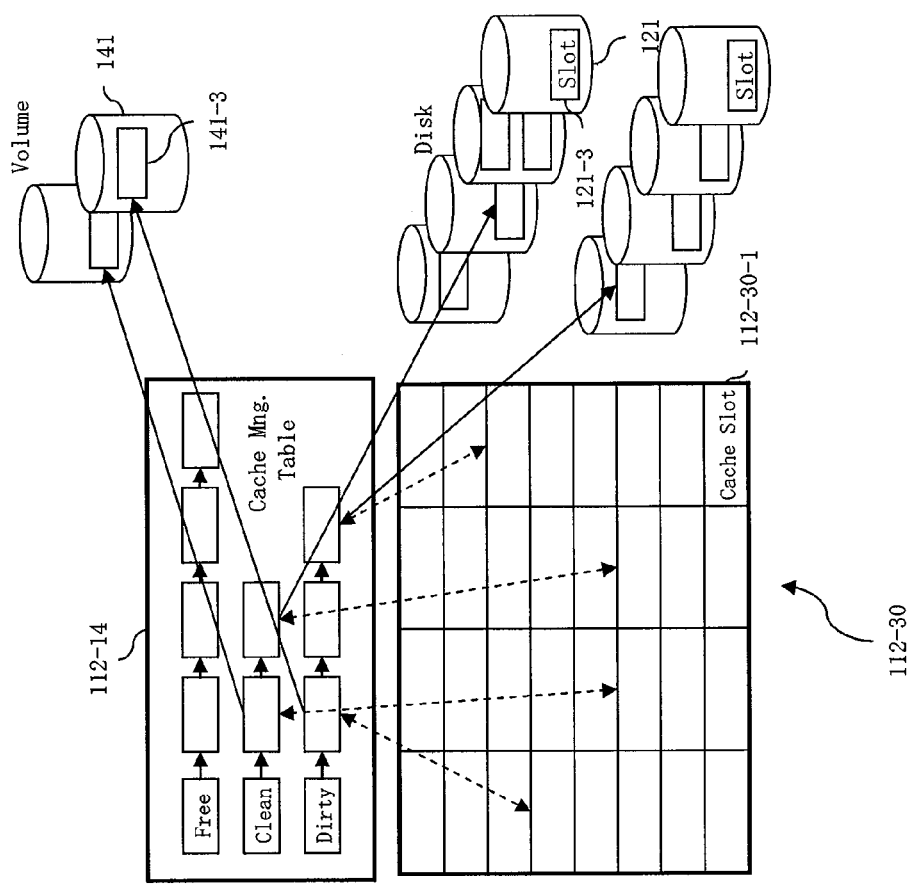
FIG. 13 illustrates an example of the logical structure of the cache in the memory of FIG. 2.

FIG. 13 illustrates an example of the logical structure of the Cache Area 112-30 in the memory 112 of FIG. 2. The arrowed lines include dashed lines which mean that an object refers by pointer, and solid lines which mean that an object refers by calculation. The Cache Data Area 112-30 is divided into plural cache slots 112-30-1. The size of a cache slot 112-30-1 equals to the size of a Capacity Pool Stripe 121-3 and the size of a Virtual Volume Slot 141-3. The Cache Management Table 112-18 and the cache slot 112-30-1 are on a one-to-one relation. The Cache Management Table 112-18 refers to the Virtual Volume Slot 141-3 and it can resolve Capacity Pool Stripe 121-3 by using the RAID Group Management Table 112-11-1.

Figure 14:
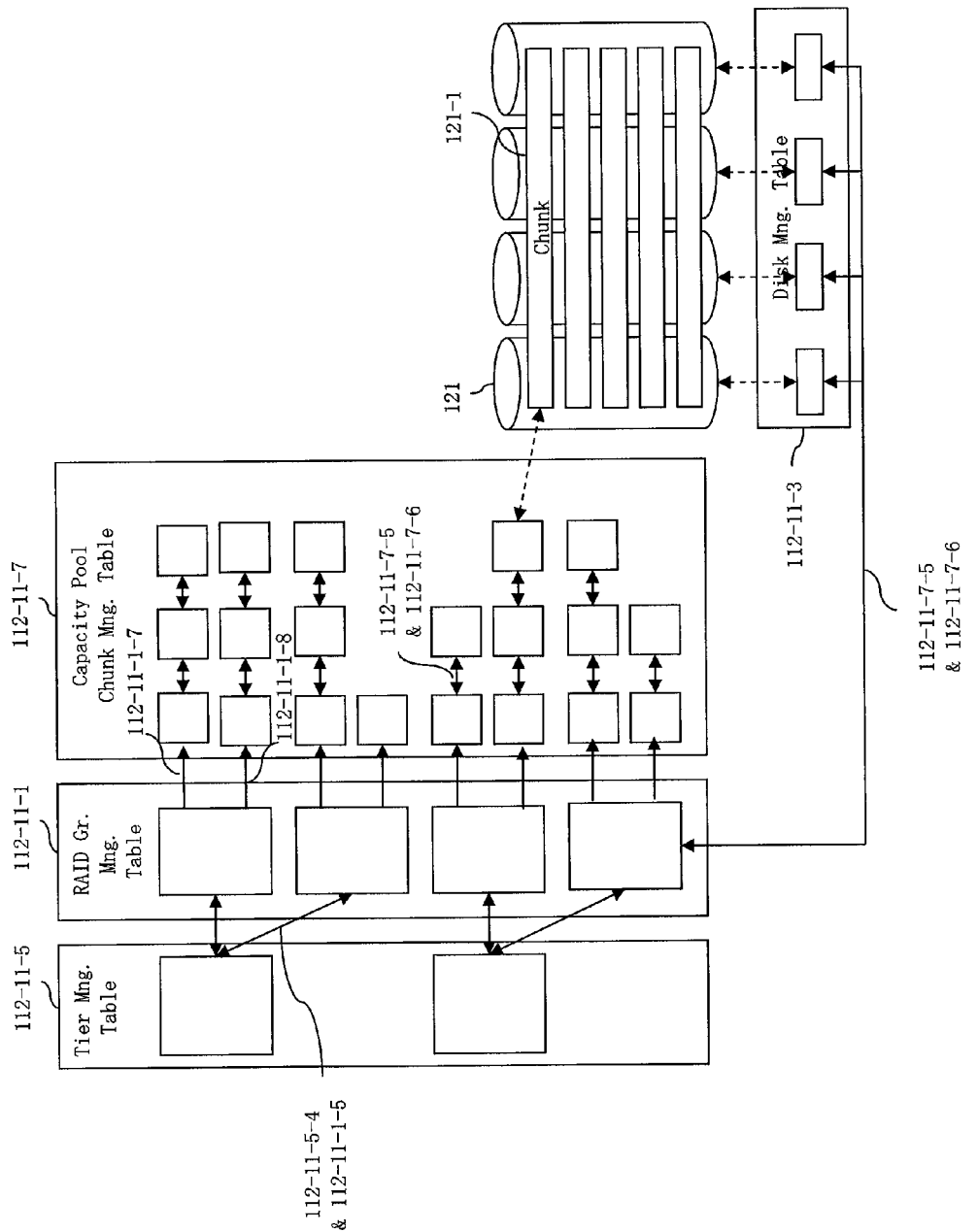
FIG. 14 illustrates an example of the logical structure of a capacity pool chunk according to the first embodiment.

FIG. 14 illustrates an example of the logical structure of a capacity pool chunk 121-1 according to the first embodiment. The arrowed lines include solid lines which mean that an object refers by pointer, and dashed lines which mean that an object refers by calculation. For the tiers, the Tier Management Table 112-11-5 refers to the RAID Group Management Tables 112-11-1. For the RAID groups, the RAID Group Management Table 112-11-1 refers to the Tier Management Table 112-11-5, refers to the Disk Management Tables 112-11-3 of the disks belonging thereto, and refers to the Capacity Pool Chunk Management Table 112-11-7 by Free Chunk Queue 112-15-03 and Used Chunk Queue 112-15-04. For the capacity pool chunks 121-1, the relations of the capacity pool chunks 121-1 and the Capacity Pool Chunk Management Table 112-11-7 are fixed.

Figure 15:
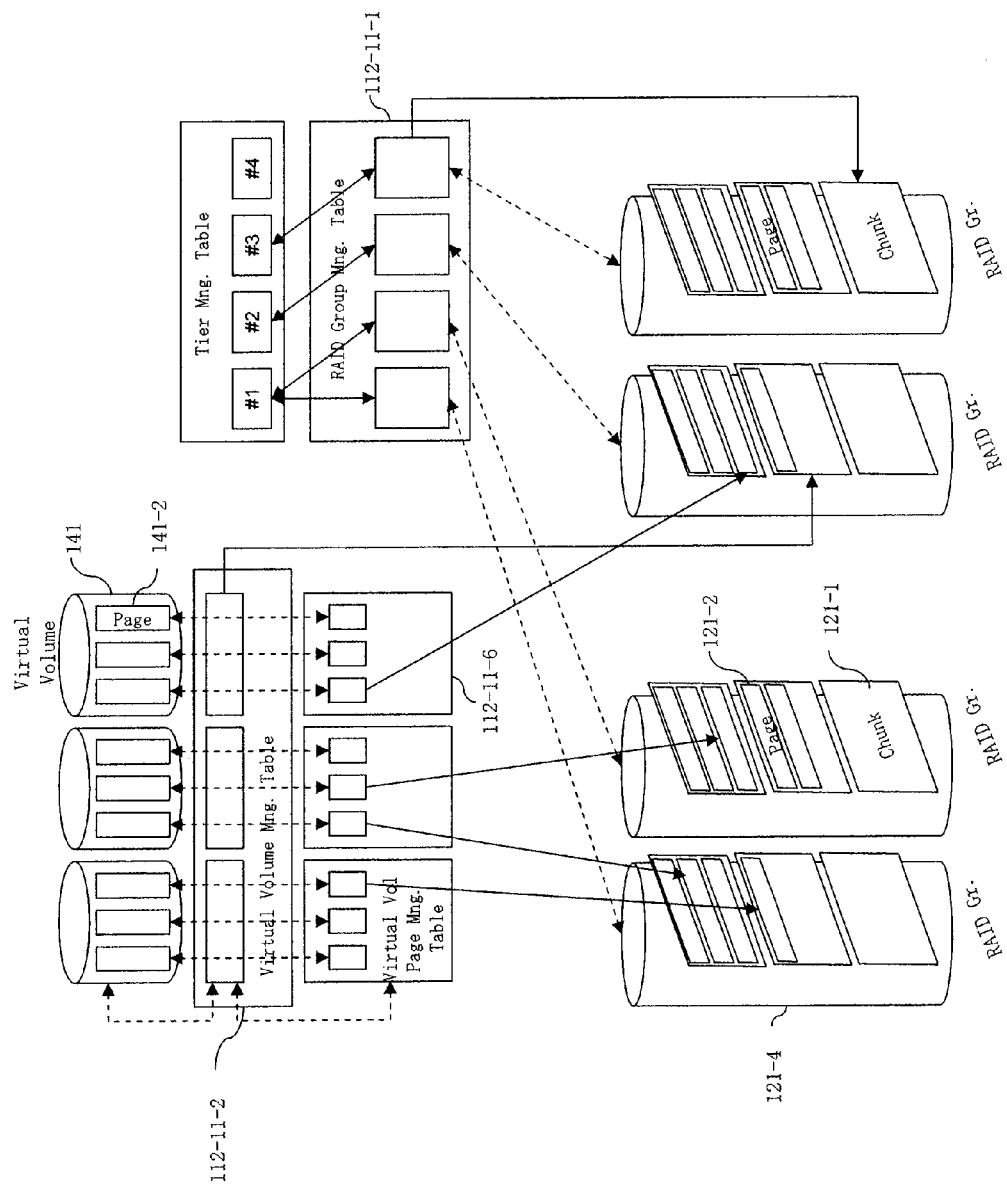
FIG. 15 illustrates an example of table reference structure toward the capacity pool.

FIG. 15 illustrates an example of table reference structure toward the capacity pool. The arrowed lines include solid lines which mean that an object refers by pointer, and dashed lines which mean that an object refers by calculation. For the virtual volumes 141, the virtual volumes 141 and the Virtual Volume Management Table 112-11-2 are on a one-to-one relation. The Virtual Volume Management Table 112-11-2 refers to capacity pool pages 121-2 currently in use. For the virtual volume pages 141-2, the virtual volume pages 141-2 and the Virtual Volume Page Management Table 112-11-6 are on a one-to-one relation. The Virtual Volume Page Management Table 112-11-6 refers to a stripe of the capacity pool pages 121-2, if a page is allocated. For the RAID groups, the RAID groups and the RAID Group Management Table 112-11-1 are on a one-to-one relation. The RAID Group Management Table 112-11-1 refers to used and unused capacity pool chunks 112-1.

Figure 16:
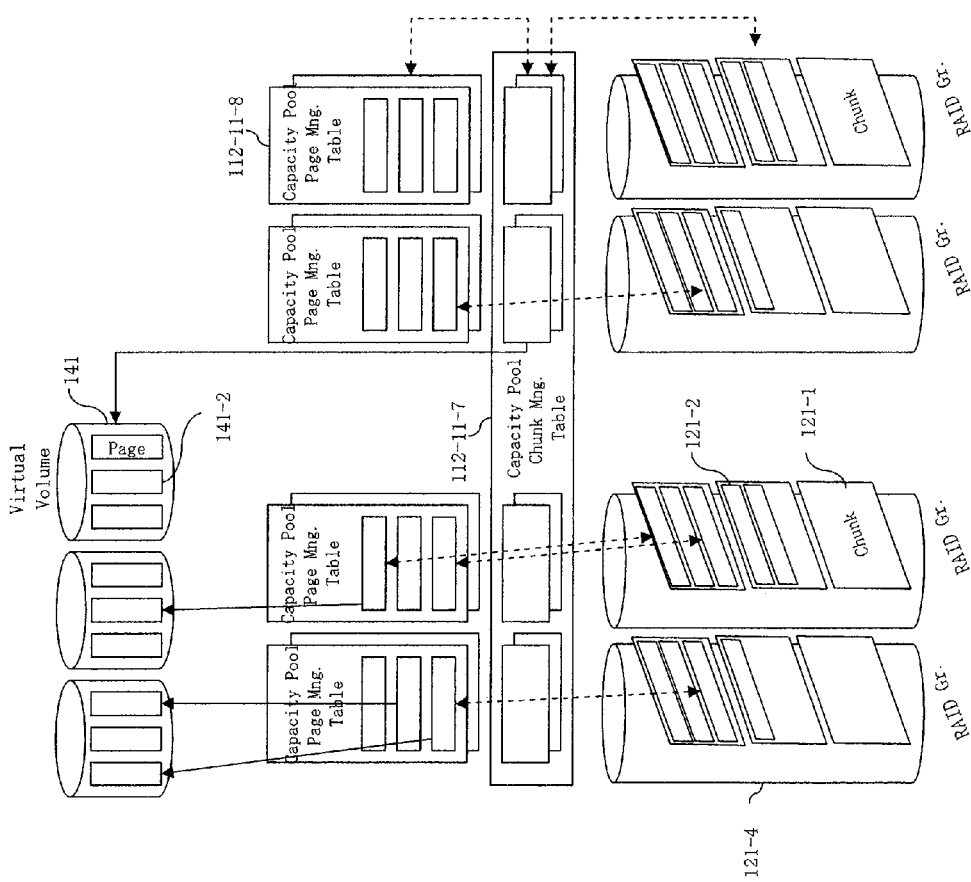
FIG. 16 illustrates an example of table reference structure toward the virtual volumes.

FIG. 16 illustrates an example of table reference structure toward the virtual volumes 141. The arrowed lines include solid lines which mean that an object refers by pointer, and dashed lines which mean that an object refers by calculation. For the capacity pool chunks 121-1, the capacity pool chunks 121-1 and the Capacity Pool Chunk Management Table 112-11-7 are on a one-to-one relation. The Capacity Pool Chunk Management Table 112-11-7 refers to the virtual volumes 141. For the capacity pool pages 121-2, the Capacity Pool Page Management Table 112-11-8 refers to the virtual volume pages 141-2.

4. Process Flow Diagrams

FIG. 17 illustrates an example of a process flow of the Write I/O Control 112-21-1 in the memory 112 of FIG. 2. The program starts in step 112-21-1-1. In step 112-21-1-2, the program calls the Cache Control 112-28 to search the cache slot 112-30-1. In step 112-21-1-3, the program receives the write I/O data from the host computer 300 and stores it to the aforesaid cache slot 112-30-1. The program ends in step 112-21-1-5.

FIG. 18 illustrates an example of a process flow of the Read I/O Control 112-21-2 in the memory 112 of FIG. 2. The program starts in step 112-21-2-1. In step 112-21-2-2, the program calls the Cache Control 112-28 to search the cache slot 112-30-1. In step 112-21-2-3, the program checks the status of the aforesaid cache slot 112-30-1 to determine whether the data has already been stored there or not. In step 112-21-2-4, the program calls the Staging Control 112-22-1 (see FIG. 19). In step 112-21-2-5, the program transfers the data in the cache slot 112-30-1 to the host computer 300. The program ends in step 112-21-2-6.

Figure 19:
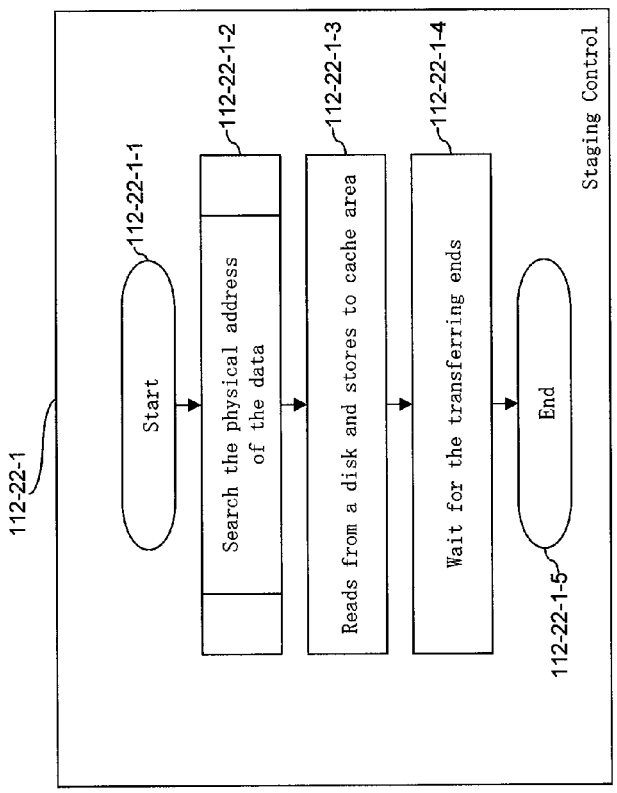
FIG. 19 illustrates an example of a process flow of the Staging Control in the memory of FIG. 2.

FIG. 19 illustrates an example of a process flow of the Staging Control 112-22-1 in the memory 112 of FIG. 2. The program starts in step 112-22-1-1. In step 112-22-1-2, the program calls the Page Mapping Control 112-27-1 to search a capacity pool page 121-2 for the virtual volume page. In step 112-22-1-3, the program reads data from a slot in the disk 121 and stores it to the Cache Data Area 112-30. In step 112-22-1-4, the program waits for the data transfer to end. The program ends in step 112-22-1-5.

Figure 20:
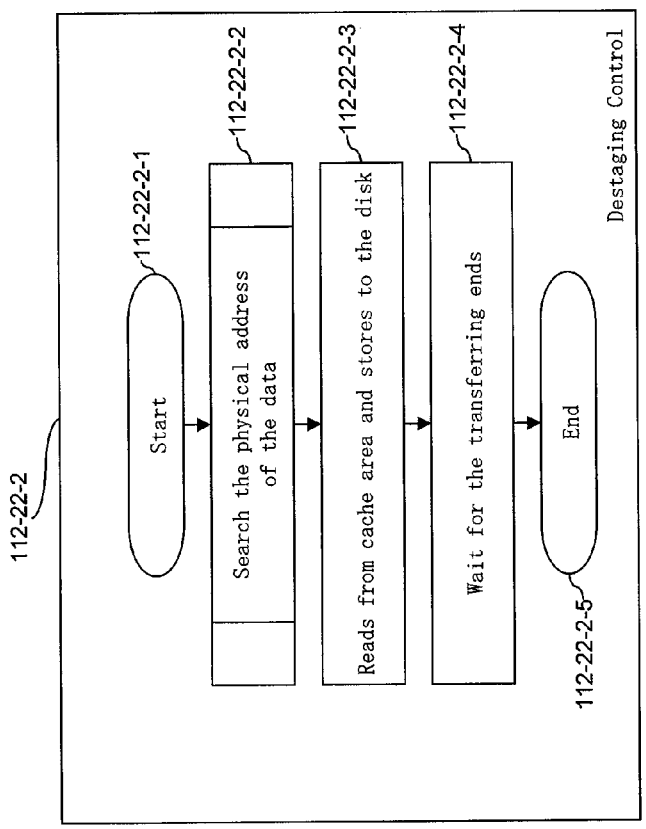
FIG. 20 illustrates an example of a process flow of the Destaging Control in the memory of FIG. 2.

FIG. 20 illustrates an example of a process flow of the Destaging Control 112-22-2 in the memory 112 of FIG. 2. The program starts in step 112-22-2-1. In step 112-22-2-2, the program calls the Page Mapping Control 112-27-1 to search or allocate a capacity pool page 121-2 for the virtual volume page. In step 112-22-2-3, the program reads data from a slot in the Cache Data Area 112-30 and stores it to the disk 121. In step 112-22-2-4, the program waits for the data transfer to end. The program ends in step 112-22-2-5.

Figure 21:
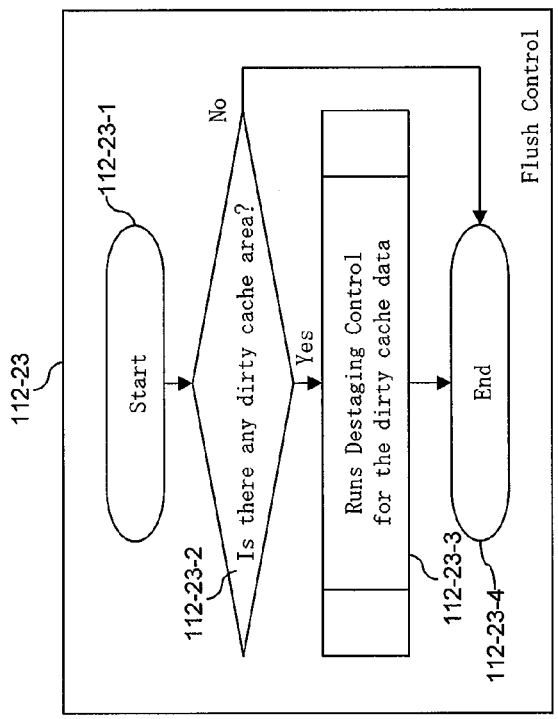
FIG. 21 illustrates an example of a process flow of the Flush Control in the memory of FIG. 2.

FIG. 21 illustrates an example of a process flow of the Flush Control 112-23 in the memory 112 of FIG. 2. The program starts in step 112-23-1. In step 112-23-2, the program reads the "Dirty Queue" of the Cache Management Table 112-14. In step 112-23-3, the program calls the Destaging Control 112-22-2 to destage the found dirty cache slot. The program skips step 112-23-3 if no dirty cache slot is found. The program ends in step 112-23-4.

Figure 22:
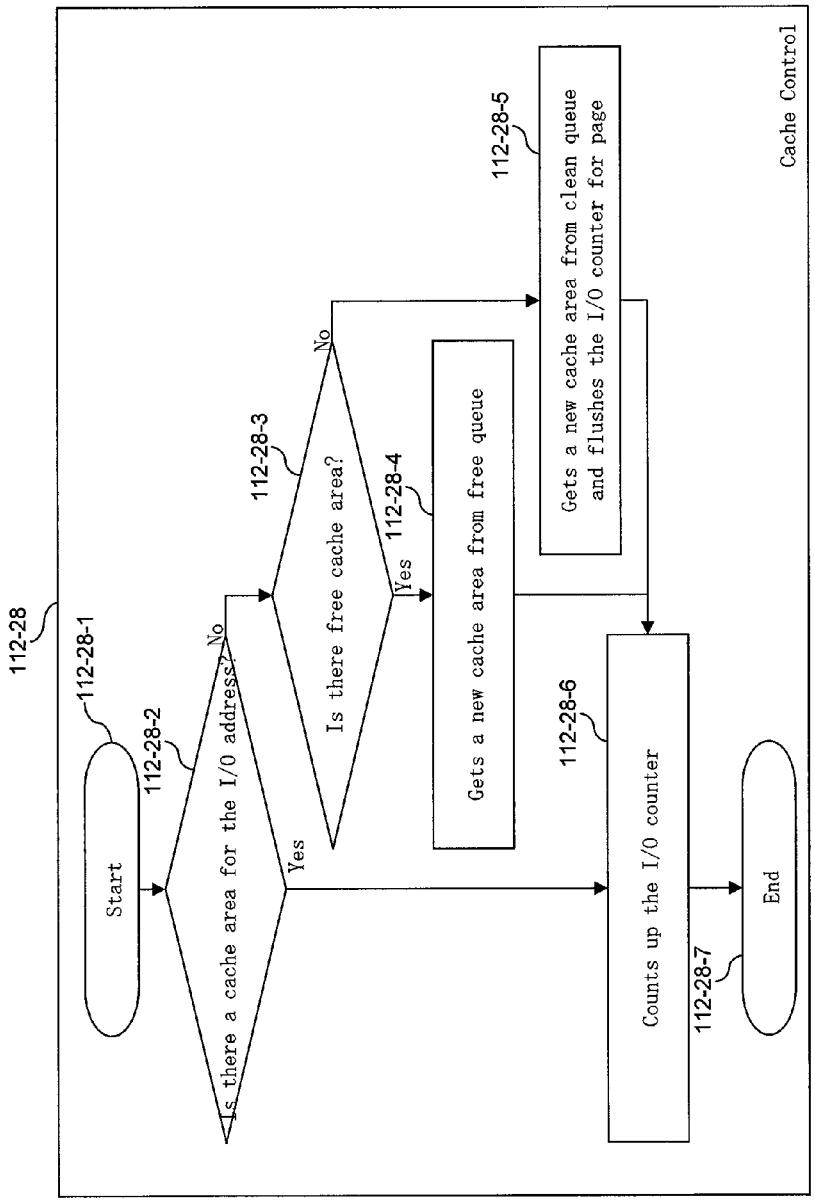
FIG. 22 illustrates an example of a process flow of the Cache Control in the memory of FIG. 2.

FIG. 22 illustrates an example of a process flow of the Cache Control 112-28 in the memory 112 of FIG. 2. The program starts in step 112-28-1. In step 112-28-2, the program searches a cache slot of a designated address. If a cache slot is found, the program proceeds to step 112-28-6. If not, the program proceeds to step 112-28-3. In step 112-28-3, the program checks to determine whether a free cache slot remains or not. If there is a free cache slot, the program gets a new cache slot from free queue for the designated address in step 112-28-4. If not, the program selects a clean cache slot, counts up the I/O counter of the virtual volume page of the clean cache slot, purges the clean slot, and allocates the cache slot for the designated address in step 112-28-5. Finally, in step 112-28-6, the program counts up the I/O Counter or Access Counter 112-14-7. The program ends in step 112-28-7.

Figure 23:
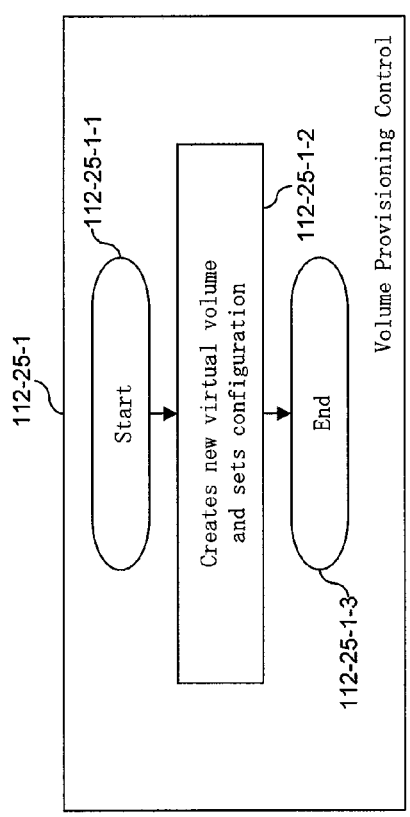
FIG. 23 illustrates an example of a process flow of the Volume Provisioning Control in the memory of FIG. 2.

FIG. 23 illustrates an example of a process flow of the Volume Provisioning Control 112-25-1 in the memory 112 of FIG. 2. The program starts in step 112-25-1-1. In step 112-25-1-2, the program registers the virtual volume information to the Virtual Volume Management Table 112-11-2. The virtual volume information includes volume number, volume capacity, and volume tier number. The program ends in step 112-25-1-3.

Figure 24:
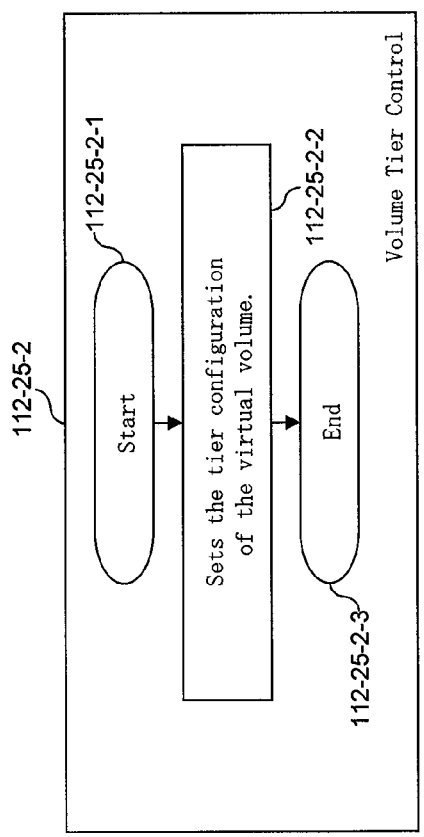
FIG. 24 illustrates an example of a process flow of the Volume Tier Control in the memory of FIG. 2.

FIG. 24 illustrates an example of a process flow of the Volume Tier Control 112-25-2 in the memory 112 of FIG. 2. The program starts in step 112-25-2-1. In step 112-25-2-2, the program changes the virtual volume tier information in the Virtual Volume Management Table 112-11-2. The program ends in step 112-25-2-3.

Figure 25:
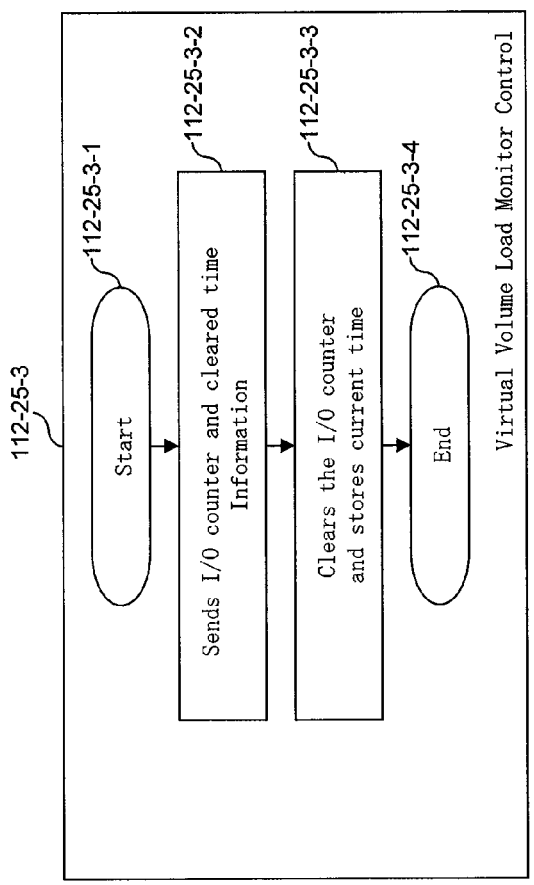
FIG. 25 illustrates an example of a process flow of the Virtual Volume Load Monitor Control in the memory of FIG. 2.

FIG. 25 illustrates an example of a process flow of the Virtual Volume Load Monitor Control 112-25-3 in the memory 112 of FIG. 2. The program starts in step 112-25-3-1. In step 112-25-3-2, the program sends the I/O counter in column 112-11-6-4 and cleared time information (current time after clearing the I/O counter) in column 112-11-6-5 of the Virtual Volume Page Management Table 112-11-6 to the management terminal 400. In step 112-25-3-3, the program clears the I/O counter and registers the current time as the cleared time. The program ends in step 112-25-3-4.

Figure 26:
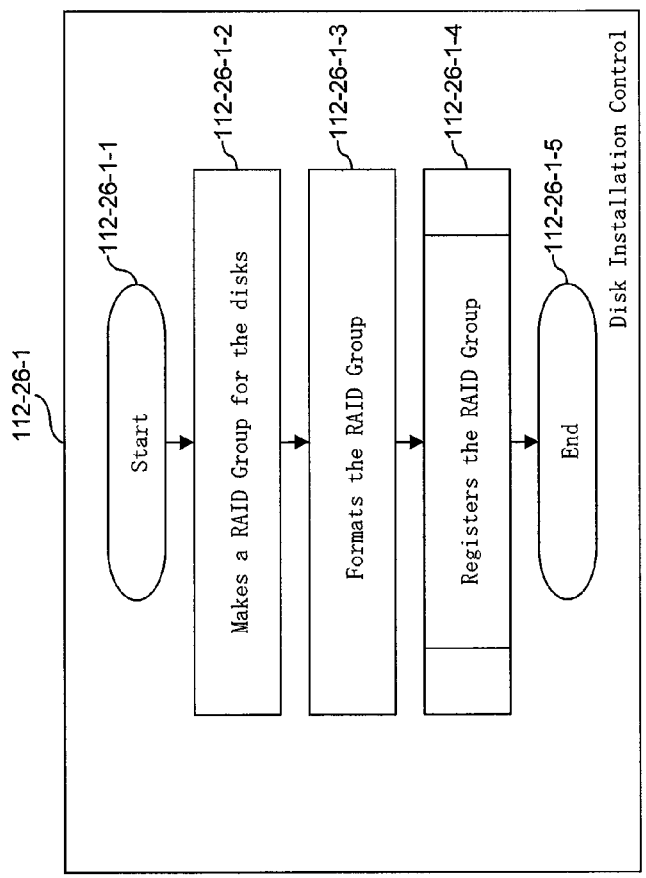
FIG. 26 illustrates an example of a process flow of the Disk Installation Control in the memory of FIG. 2.

FIG. 26 illustrates an example of a process flow of the Disk Installation Control 112-26-1 in the memory 112 of FIG. 2. The program starts in step 112-26-1-1. In step 112-26-1-2, the program makes a RAID group for the disks and registers the installed disk information to the Disk Management Table 112-11-3. In step 112-26-1-3, the program formats the RAID group. In step 112-26-1-4, the program calls the Tier Registration Control 112-26-3 (see FIG. 28) to register the tier information of the RAID group to the RAID Group Management Table 112-11-1. The program ends in step 112-26-1-5.

Figure 27:
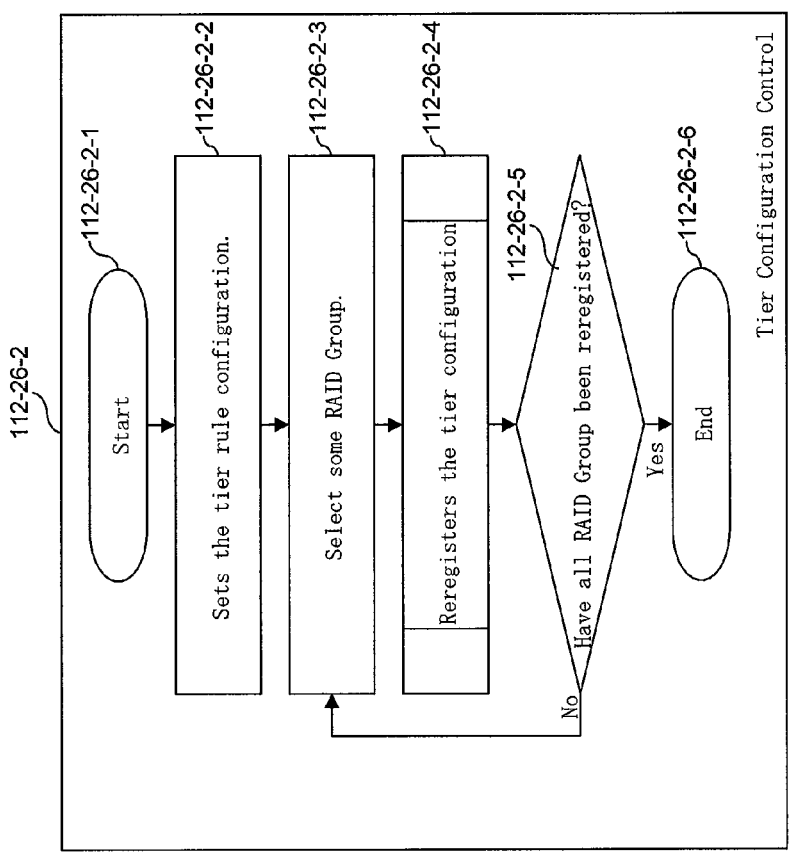
FIG. 27 illustrates an example of a process flow of the Tier Configuration Control in the memory of FIG. 2.

FIG. 27 illustrates an example of a process flow of the Tier Configuration Control 112-26-2 in the memory 112 of FIG. 2. The program starts in step 112-26-2-1. In step 112-26-2-2, the program registers the tier rule to Tier Management Table 112-11-5 to set the tier rule configuration. In step 112-26-2-3, the program selects a RAID group in the capacity pool. In step 112-26-2-4 for reregistering the tier configuration, the program calls the Tier Registration Control 112-26-3 (see FIG. 28) to change a tier of the RAID group in accordance with the registered tier rule. In step 112-26-2-5, the program loops back to repeat steps 112-26-2-3 to 112-26-2-5 until all RAID groups are processed. The program ends in step 112-26-2-6.

Figure 28:
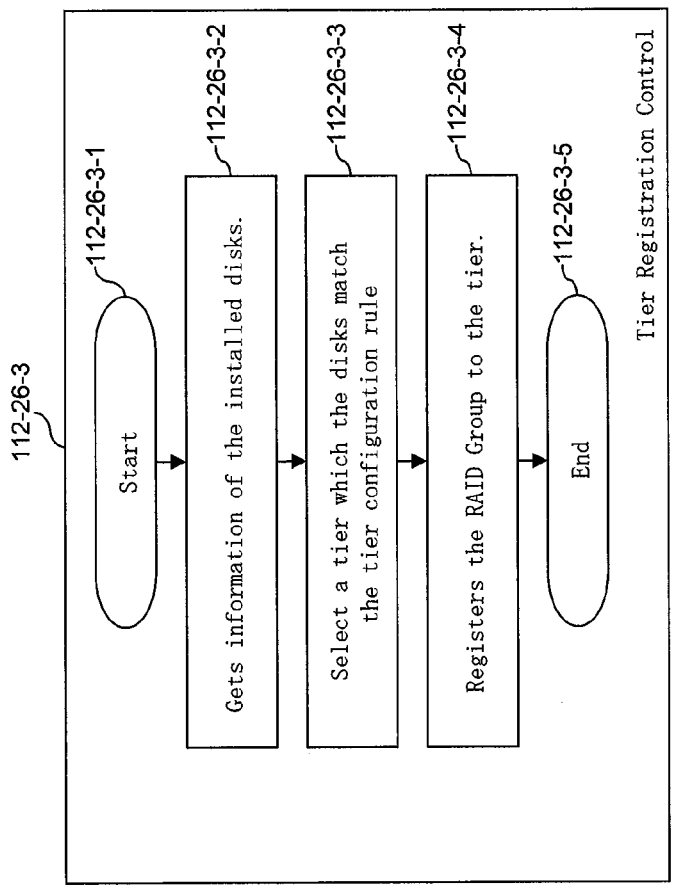
FIG. 28 illustrates an example of a process flow of the Tier Registration Control in the memory of FIG. 2.

FIG. 28 illustrates an example of a process flow of the Tier Registration Control 112-26-3 in the memory 112 of FIG. 2. The program starts in step 112-26-3-1. In step 112-26-3-2, the program gets the disk information of the RAID group from the Disk Management Table 112-11-3 and the Disk Information Table 112-11-4. In step 112-26-3-3, the program checks the tier rule in the Tier Management Table 112-11-5 and selects a matched tier for the RAID group by matching the tier rule. In step 112-26-3-4 for registering the capacity pool chunk to the tier, the program registers the tier information to the RAID Group Management Table 112-11-1. The program ends in step 112-26-3-5.

Figure 29:
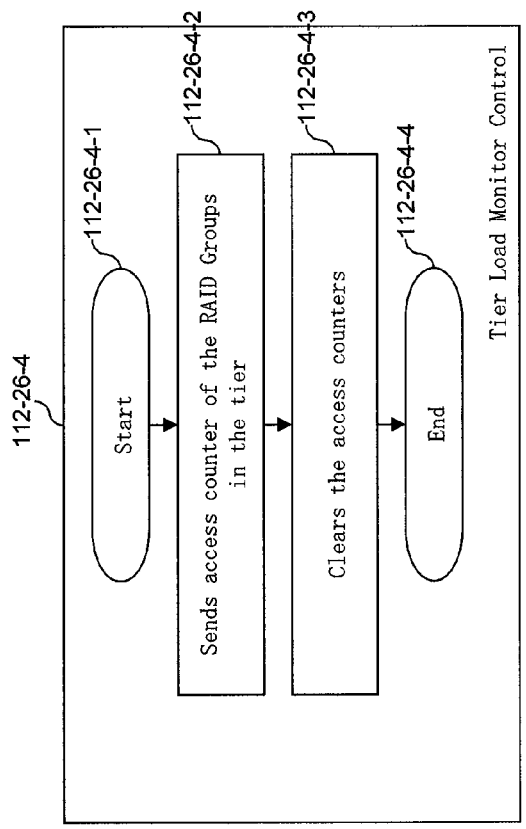
FIG. 29 illustrates an example of a process flow of the Virtual Volume Load Monitor Control in the memory of FIG. 2.

FIG. 29 illustrates an example of a process flow of the Virtual Volume Load Monitor Control 112-25-4 in the memory 112 of FIG. 2. The program starts in step 112-26-4-1. In step 112-26-4-2, the program sends the I/O counter or access counter in column 112-11-1-6 in the RAID Group Management Table 112-11-1 to the management terminal 400. In step 112-26-4-3, the program clears the I/O counter. The program ends in step 112-26-4-4.

Figure 30:
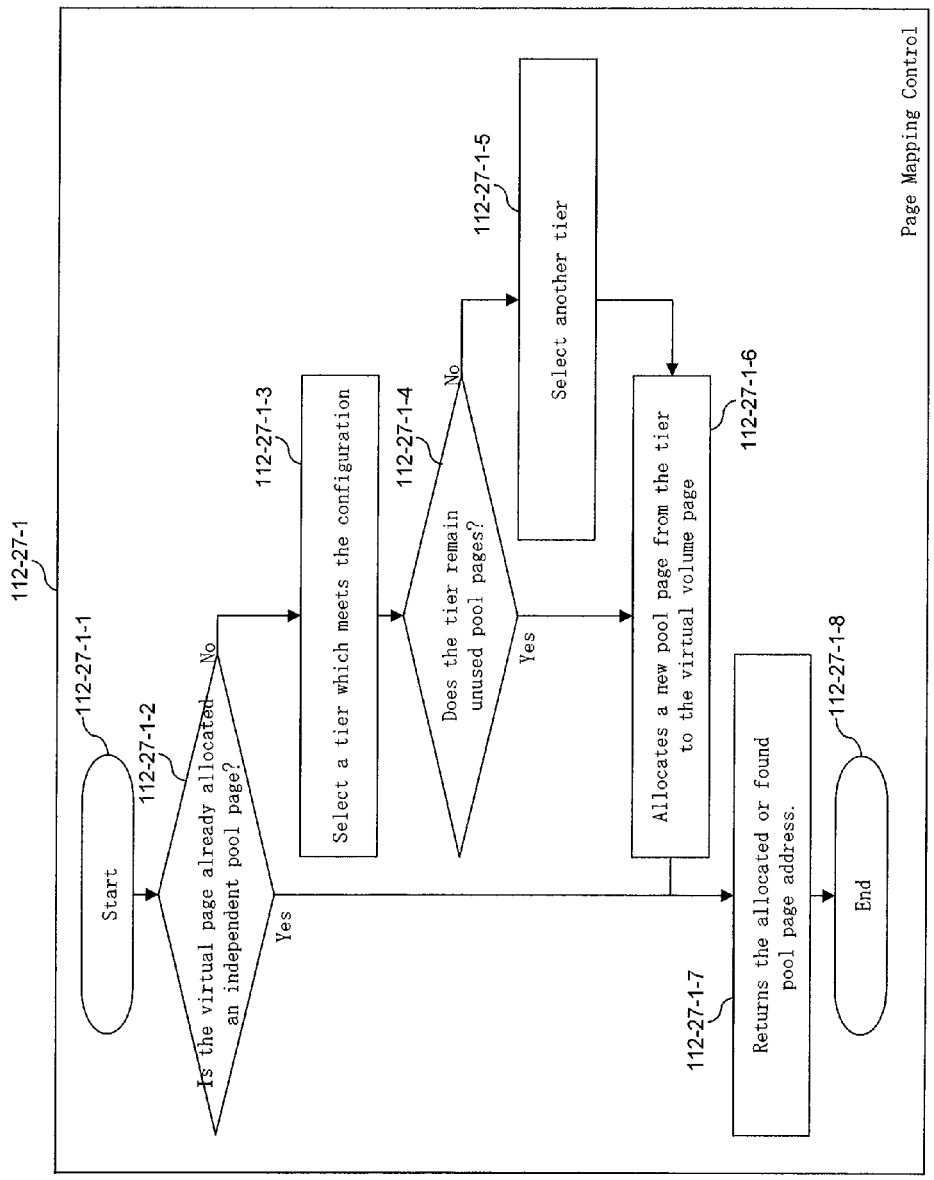
FIG. 30 illustrates an example of a process flow of the Page Mapping Control in the memory of FIG. 2.

FIG. 30 illustrates an example of a process flow of the Page Mapping Control 112-27-1 in the memory 112 of FIG. 2. The program starts in step 112-27-1-1. In step 112-27-1-2, the program checks if the designated virtual page has already been allocated a capacity pool page 121-2. In step 112-27-1-3 for selecting a tier which meets the tier configuration, the program selects the requiring tier for the virtual volume page. In step 112-27-1-4, the program checks to determine whether the selected tier has free or unused capacity pool pages or not. If there are free pages, the program allocates a new capacity pool page to the virtual volume page from a RAID group in the selected tier in step 112-27-1-6. If there are no free pages, the program first selects another (capacity remaining) tier in step 112-27-1-5 before proceeding to step 112-27-1-6. In step 112-27-1-7, the program returns the allocated or found capacity pool page information. The program ends in step 112-27-1-8.

Figure 31:
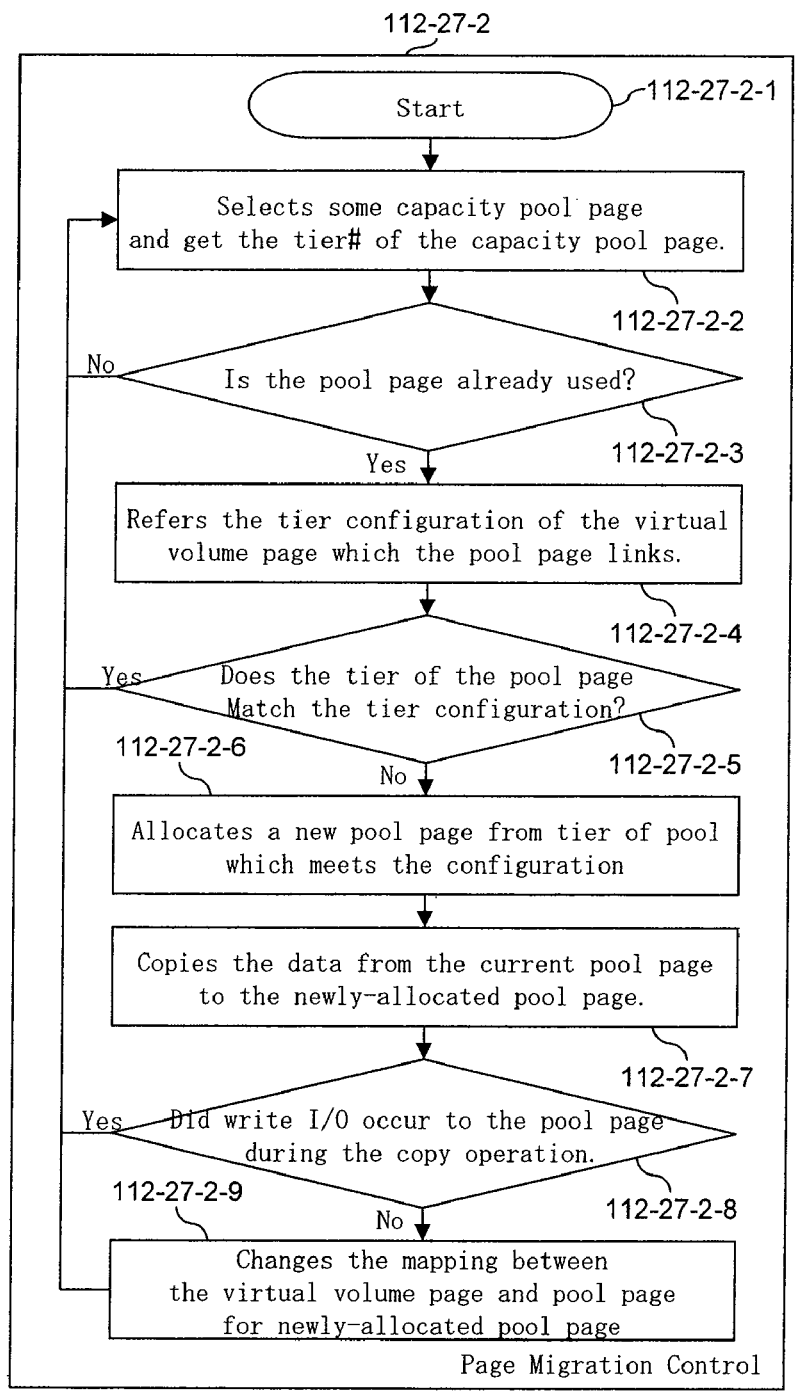
FIG. 31 illustrates an example of a process flow of the Page Migration Control in the memory of FIG. 2.

FIG. 31 illustrates an example of a process flow of the Page Migration Control 112-27-2 in the memory 112 of FIG. 2. The program starts in step 112-27-2-1. In step 112-27-2-2, the program selects a capacity pool page 121-2 and gets the information including the tier number. In step 112-27-2-3, the program checks to determine whether the capacity pool page is already used. If not, the program returns to step 112-27-2-2. If the capacity pool page 121-2 is not used, the program gets the virtual volume page information of the capacity pool page in step 112-27-2-4 by referring to the tier configuration of the virtual volume page. In step 112-27-2-5, the program checks to determine whether the capacity pool page 121-2 belongs to a correct (configured) tier with matched tier configuration. If so, the program returns to step 112-27-2-2. If not, the program allocates a new capacity pool page from a RAID group that belongs to correct tier with matched tier configuration in step 112-27-2-6. In step 112-27-2-7, the program copies the data from the current capacity pool page to the newly allocated capacity pool page. In step 112-27-2-8, the program checks if write I/O occurred to the virtual volume page during the copy operation. If so, the program returns to step 112-27-2-2. If not, the program changes the link or mapping between the virtual volume page and the capacity pool page for the newly allocated pool page in step 112-27-2-9.

5. Human Interface

Figure 32:
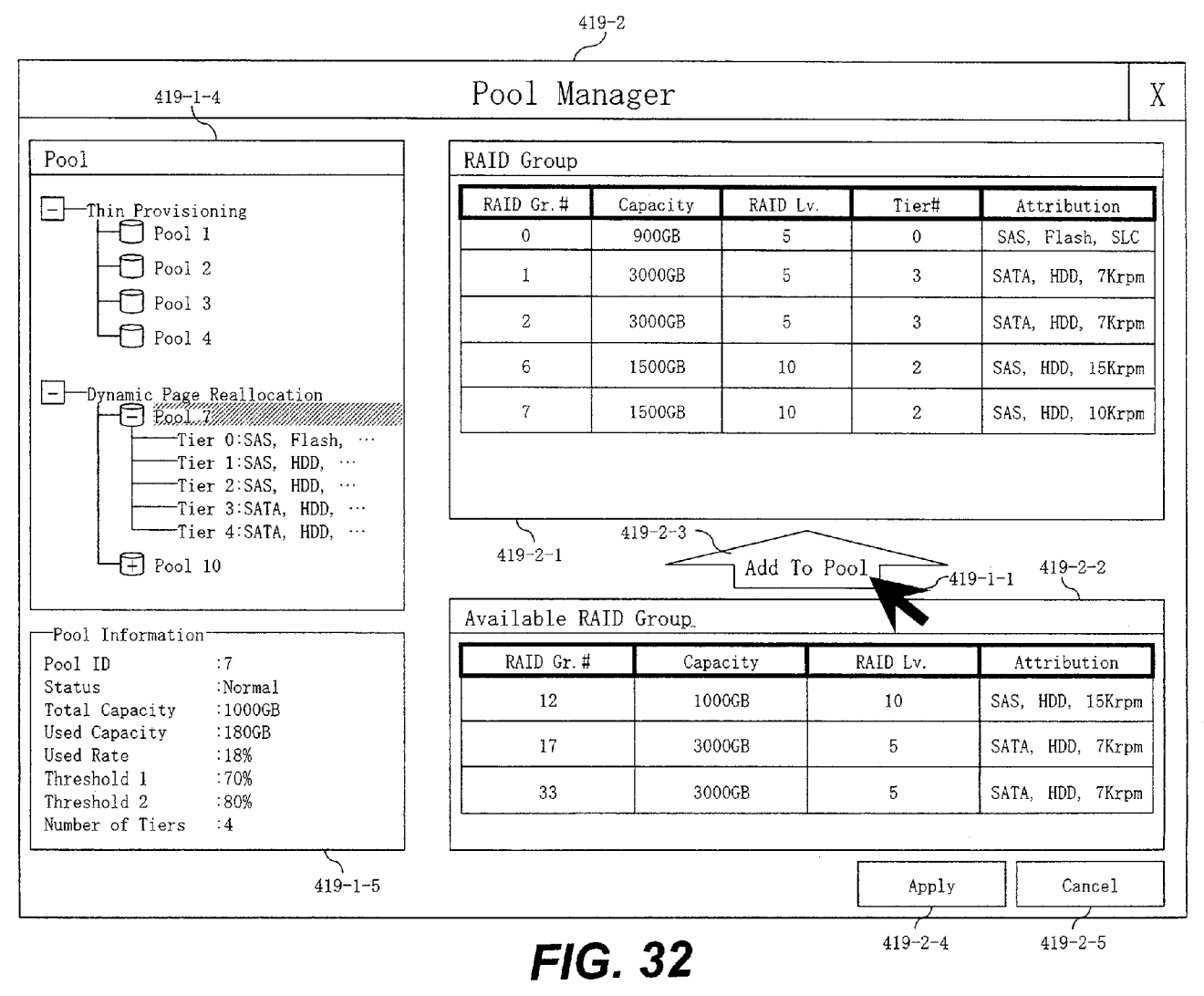

FIG. 32 illustrates an example of a pool manager window 419-2 showing the display and operation image of RAID group installation. The pool manager window 419-2 provides pool management and RAID group installation interface. A cursor 419-1-1 is a human input device pointer which the user can use to select and click elements. When an apply button 419-2-4 is clicked, the configuration is flushed to the storage subsystem 100. When a cancel button 419-2-5 is clicked, the display is restored to the current configuration. A Pool Management Tree 419-1-4 shows the structure of the pools. "Thin Provisioning Pool" is a tier unconfigurable pool. "Dynamic Page Reallocation Pool" is a tier configurable pool. The Pool Management Tree 419-1-4 shows the pool and tier relation as well as the tier and rule relation. The user can create a new pool to this tree. The user can also change the tier rule from this tree. The Pool Information 419-1-5 shows selected pool information including, for example, pool ID, status, total capacity, used capacity, used rate, warning threshold(s), number of tiers, etc. A RAID Group List 419-2-1 shows a list of the RAID groups and the structure of selected pool(s). An Available RAID Group List 419-2-2 shows a list of unused RAID groups, from which the user can select and add the RAID groups to a designated pool by clicking an Add Button 419-2-3 and the Apply Button 419-2-4. By clicking the Add Button 419-2-3, the user can add selected RAID groups to a designated pool. A cancel button 419-2-5 is available to cancel a selection.

Figure 33:
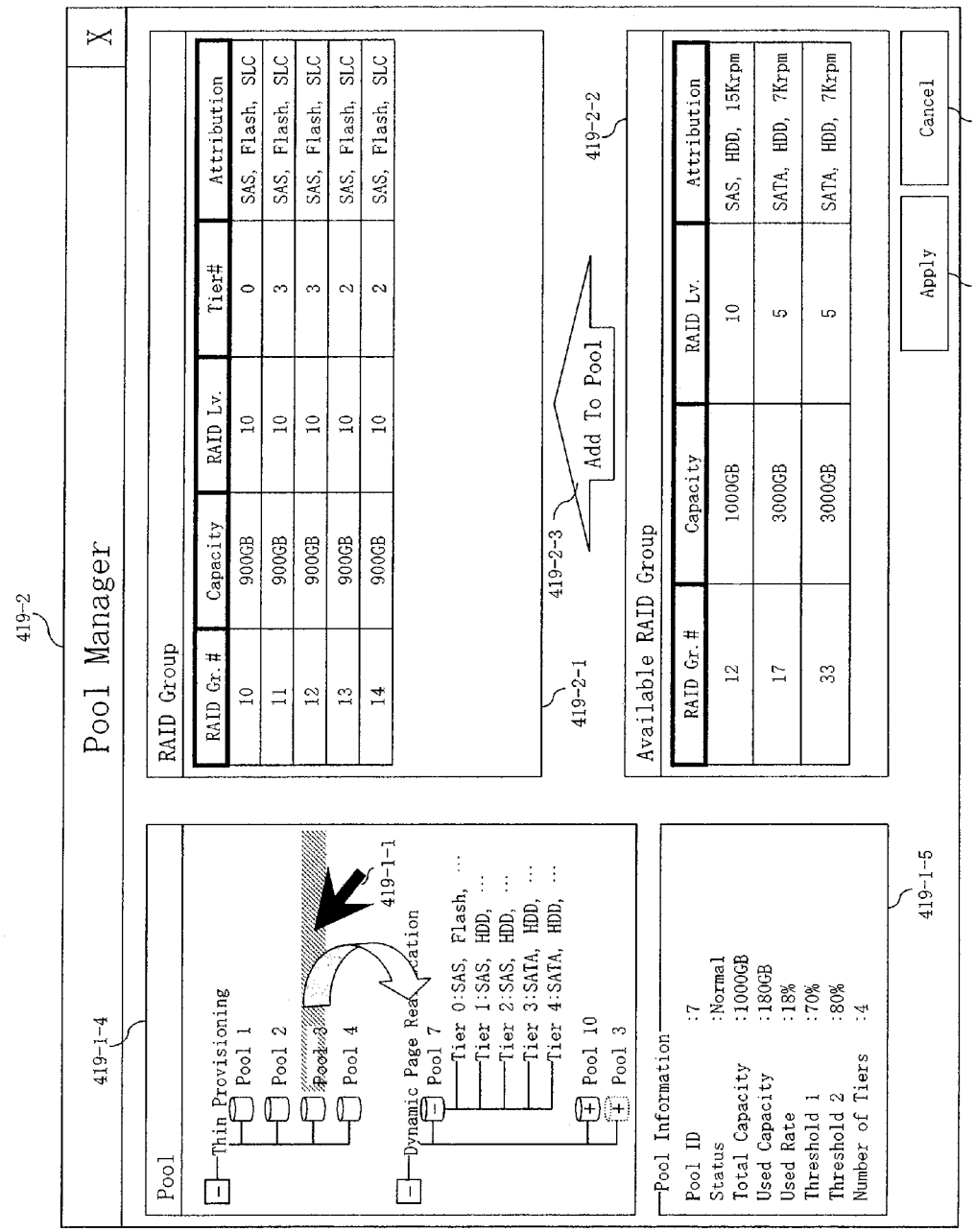
FIG. 33 illustrates an example of a pool manager window showing the display and operation image of pool changing.

FIG. 33 illustrates an example of a pool manager window showing the display and operation image of pool changing. When the user drags and drops a thin provisioning pool to a dynamic page reallocation tree within the Pool Management Tree 419-1-4, the operated pool changes to a tier configurable pool (Pool 3 under the tree).

Figure 34:
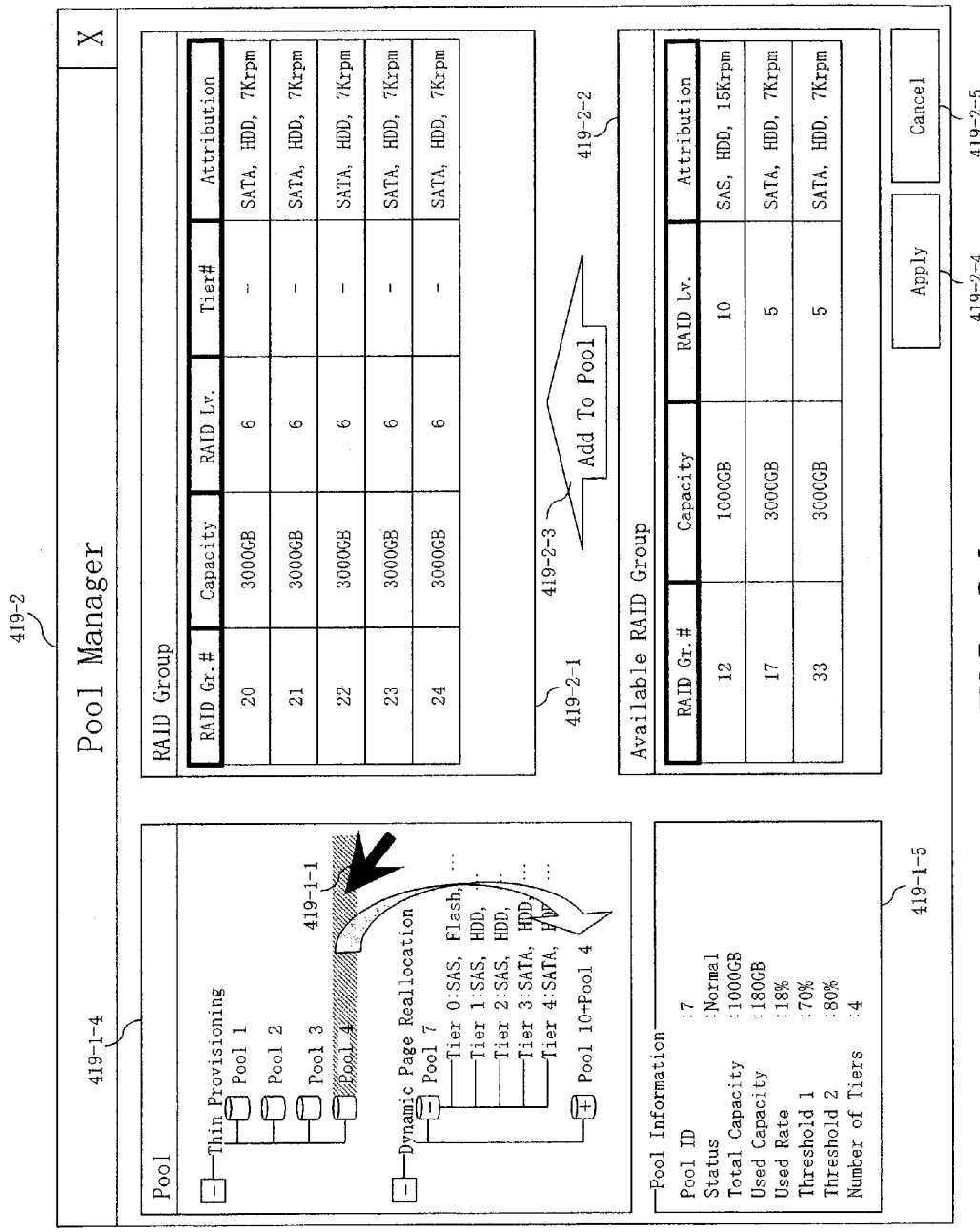
FIG. 34 illustrates an example of a pool manager window showing the display and operation image of pool consolidation.

FIG. 34 illustrates an example of a pool manager window showing the display and operation image of pool consolidation. When the user drags and drops a thin provisioning pool to a dynamic page reallocation pool within the Pool Management Tree 419-1-4, the operated pools are consolidated (Pool 4 with Pool 10) and the tier configuration rule is applied.

Figure 35:
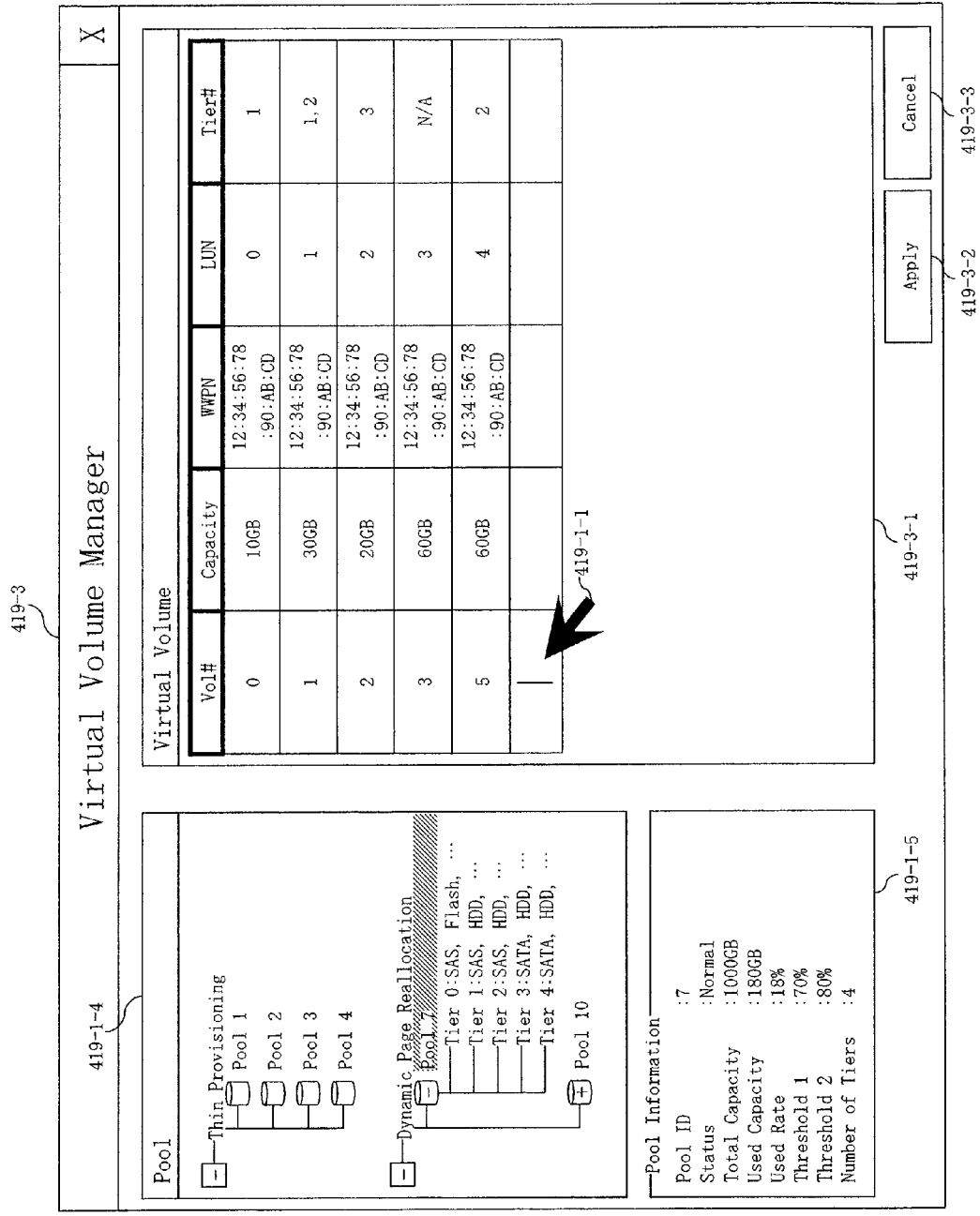
FIG. 35 illustrates an example of a virtual volume window showing the display and operation image of virtual volume provisioning and tier reconfiguration.

FIG. 35 illustrates an example of a virtual volume window showing the display and operation image of virtual volume provisioning and tier reconfiguration. The virtual volume manager window 419-3 provides pool management and virtual volume management interface. A virtual volume list 419-3-1 shows a virtual volume list of the selected pool. When the user describes new virtual volume information, a new virtual volume is provisioned. When the user changes tier configuration of an existing virtual volume, the virtual volume tier changes.

Figure 36:
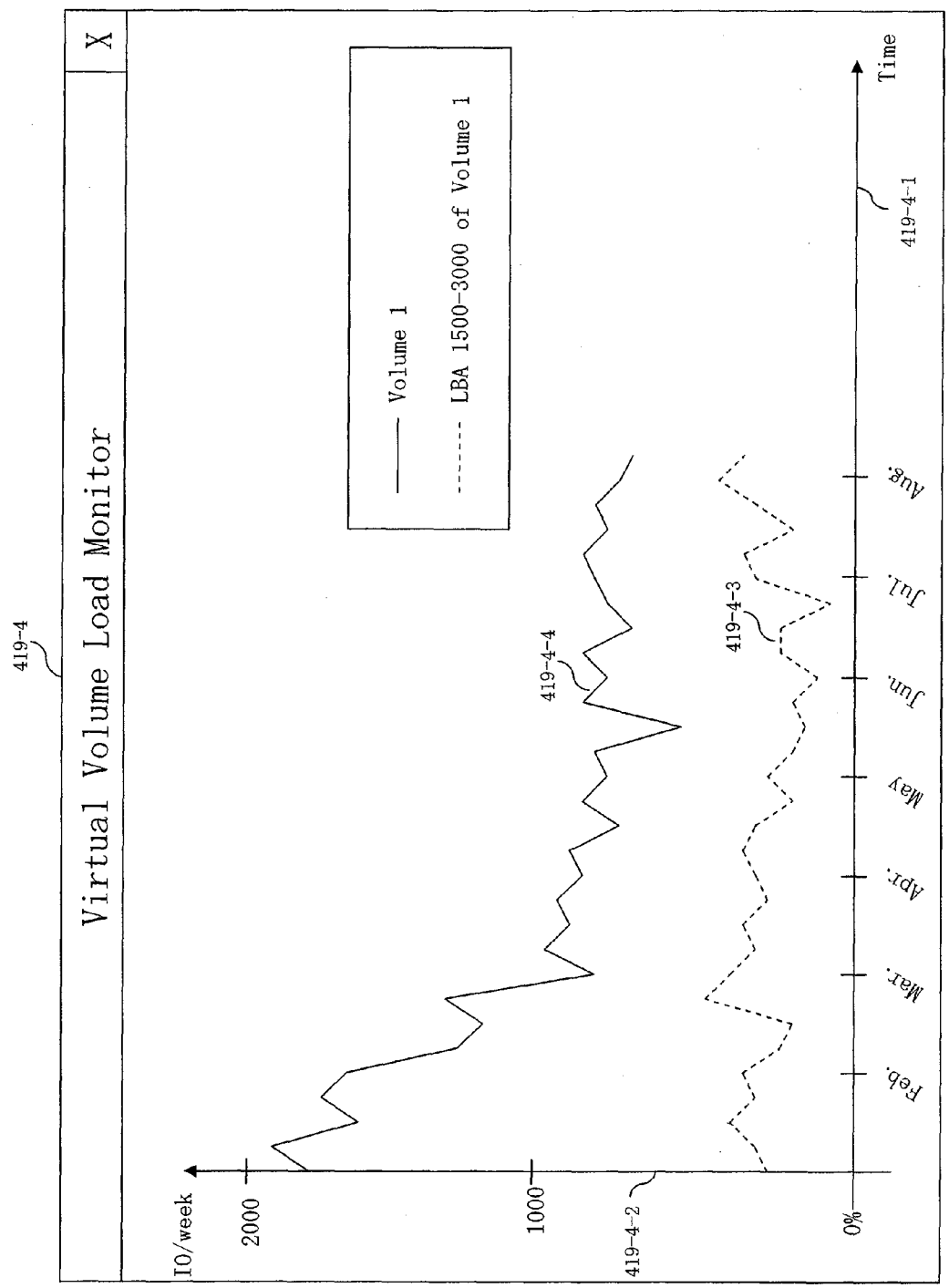
FIG. 36 illustrates an example of a display image of virtual volume load monitor.

FIG. 36 illustrates an example of a display image of virtual volume load monitor. The virtual volume load monitor window 419-4 shows the I/O transaction load of virtual volume and area in a designated virtual volume. The horizontal axis 419-4-1 shows the time, while the vertical axis 419-4-2 shows the number of transactions. The transaction history 419-4-3 and transaction history 419-4-4 each show a history of transactions.

Figure 37:
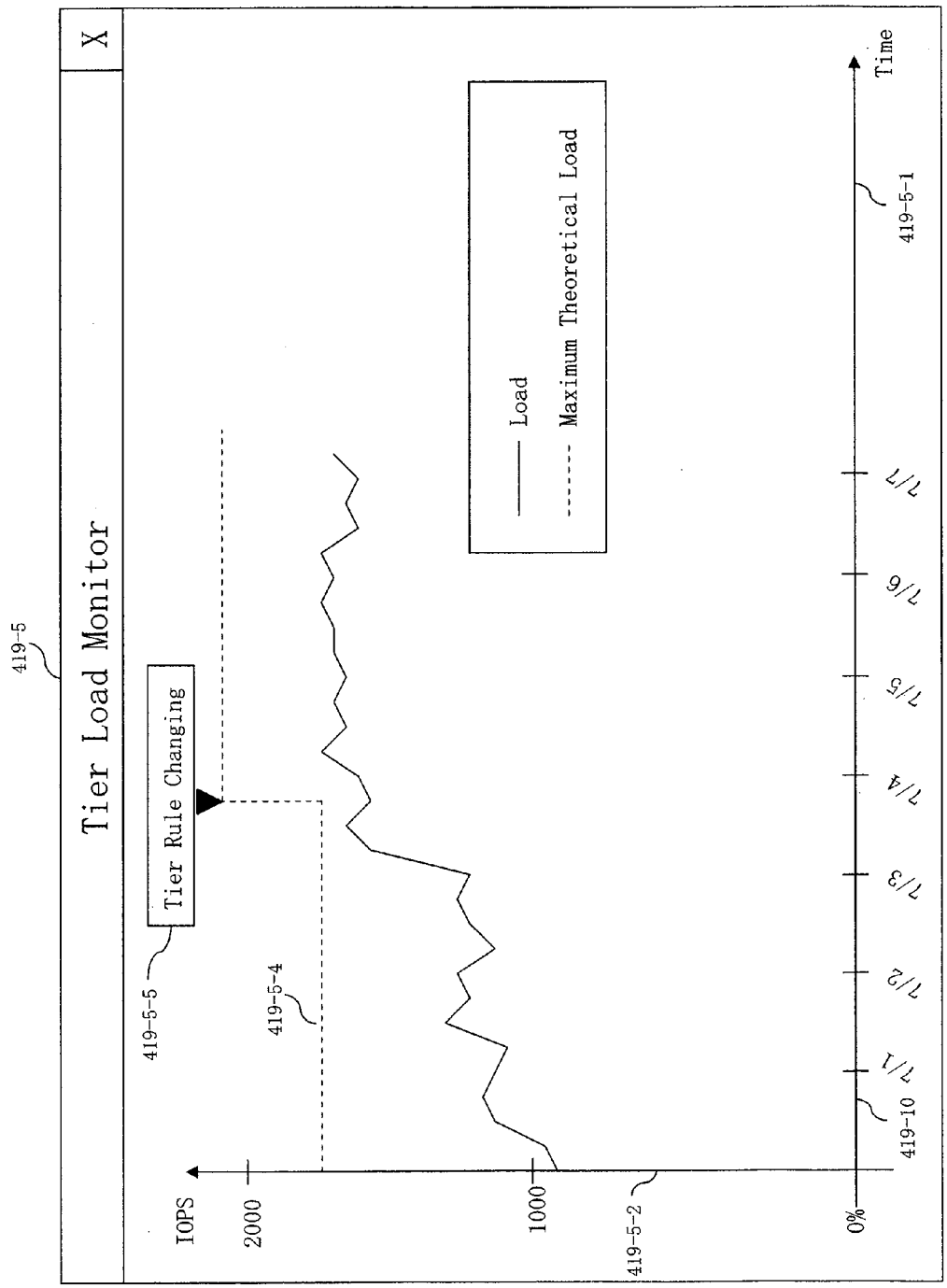
FIG. 37 illustrates an example of a display image of tier load monitor.

FIG. 37 illustrates an example of a display image of tier load monitor. The tier load monitor window 419-5 shows the I/O transaction load of RAID groups in a designated tier. The horizontal axis 419-5-1 shows the time, while the vertical axis 419-5-2 shows the number of transactions. A transaction history 419-5-3 shows the history of transactions. A maximum theoretical load 419-5-4 shows the maximum theoretical load in the current tier configuration. An event 419-5-5 shows the time the event occurs to the tier (e.g., RAID group installation).

6. Sequences

Figure 38:
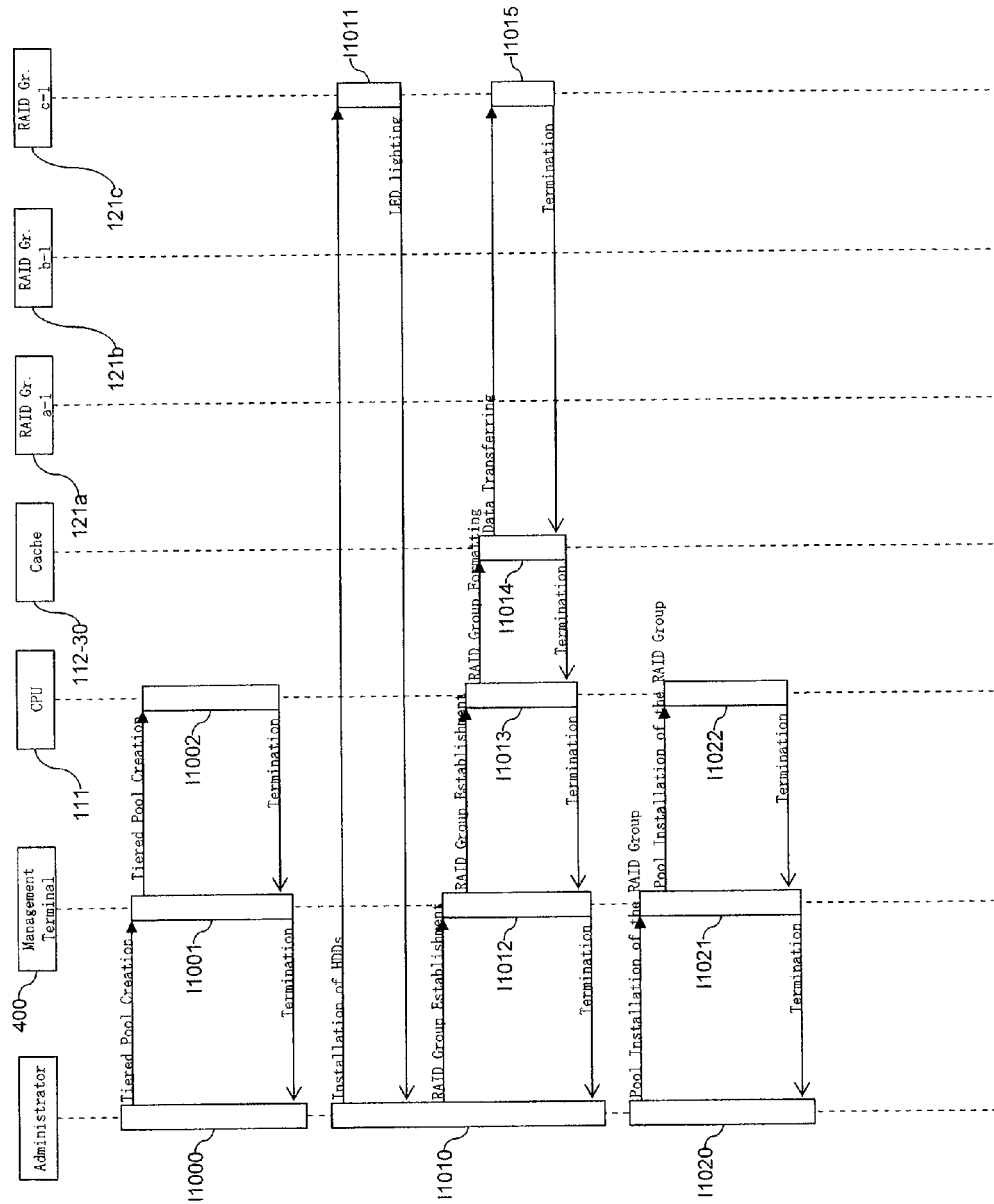
FIG. 38 illustrates an example of a sequence of steps for pool creation and disk installation according to the first embodiment.

FIG. 38 illustrates an example of a sequence of steps for pool creation and disk installation according to the first embodiment. In step I1000, the administrator creates a new pool and sets the tier rule with the pool manager window 419-2 on the storage management terminal 400. In step I1001, the storage management terminal 400 sends the new pool and tier information to the storage subsystem 100. In step I1002, the CPU 111 of the storage subsystem 100 registers the received pool and tier information. In step I1010, the administrator installs disks to the storage subsystem 100. The administrator sets the RAID group information for the installed disks with the storage management terminal 400. In step I1011, the storage subsystem 100 reports the disk installation has finished to the administrator. In step I1012, the storage management terminal 400 sends the RAID group information to the storage subsystem 100. In step I1013, the CPU 111 of the storage subsystem 100 registers the RAID group information and formats the disks. In step I1014, the Cache Area 112-30 of the storage subsystem 100 generates the formatted data and transfers it to the disks. In step I1015, the disk 121 receives the data and stores it. In step I1020, the administrator installs the formatted RAID group to the pool with the pool manager window 419-2 on the storage management terminal 400 (see FIG. 32). In step I1021, the storage management terminal 400 sends the installation information to the storage subsystem 100. In step I1022, the CPU 111 registers the RAID group according to the current tier configuration rule.

Figure 39:
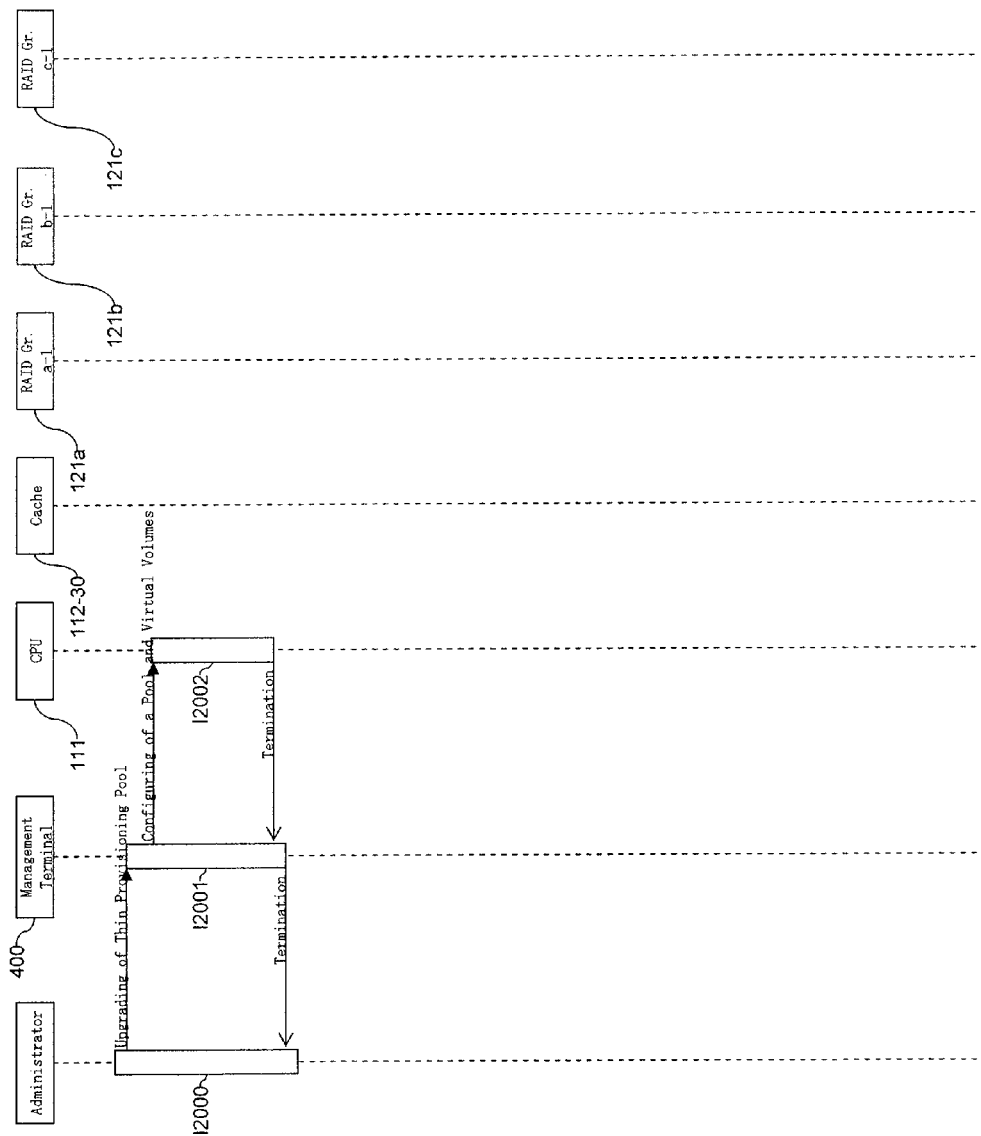
FIG. 39 illustrates an example of a sequence of steps for changing a tier unconfigurable pool to a tier configurable pool.

FIG. 39 illustrates an example of a sequence of steps for changing a tier unconfigurable pool (i.e., traditional thin provisioning pool) to a tier configurable pool. In step I2000, the administrator orders to change the pool type and sets the tier configuration rule with the pool manager window 419-2 on the storage management terminal 400 (see FIG. 33). In step I2001, the storage management terminal 400 sends the information to the storage subsystem 100. In step I2002, the CPU 111 changes the RAID group tier configuration according to the current tier configuration rule.

Figure 40:
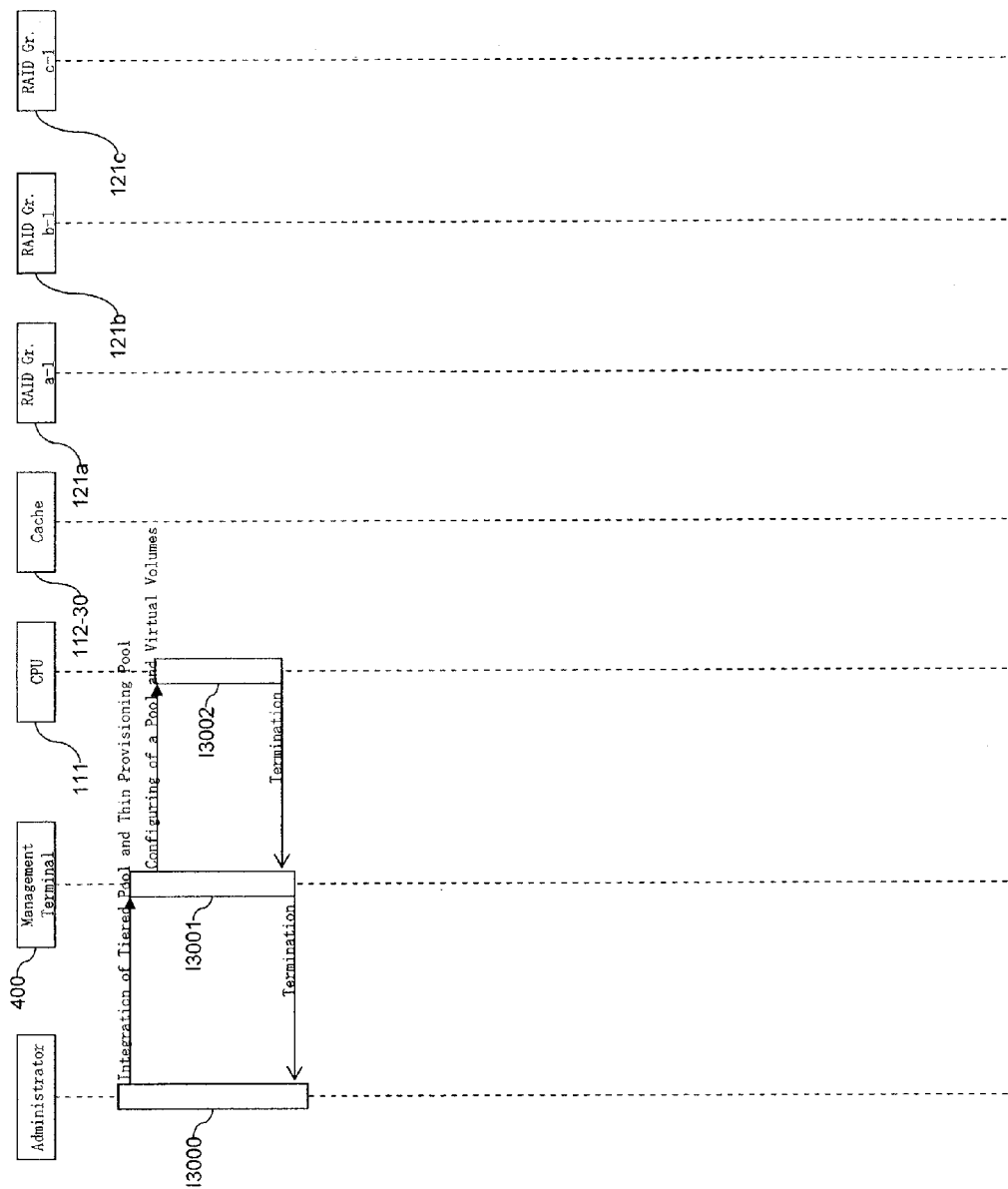
FIG. 40 illustrates an example of a sequence of steps for consolidating two storage pools.

FIG. 40 illustrates an example of a sequence of steps for consolidating two storage pools. In step I3000, the administrator orders to consolidate the pools with the pool manager window 419-2 on the storage management terminal 400 (see FIG. 34). In step I3001, the storage management terminal 400 sends the information to the storage subsystem 100. In step I3002, the CPU 111 of the storage subsystem 100 changes the RAID group tier configuration according to the current tier configuration rule.

Figure 41:
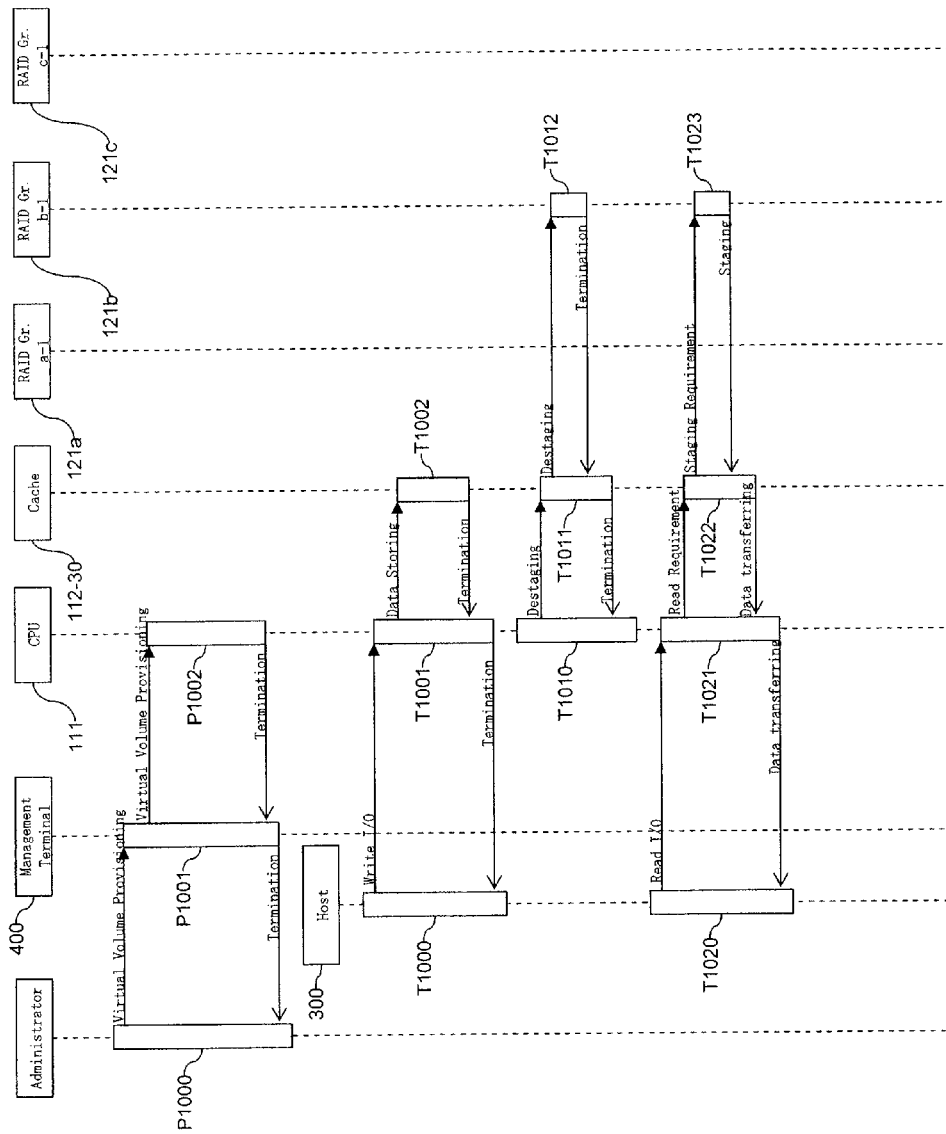
FIG. 41 illustrates an example of a sequence of steps for virtual volume provisioning and transaction.

FIG. 41 illustrates an example of a sequence of steps for virtual volume provisioning and transaction. In step P1000, the administrator orders to consolidate the pools with the virtual volume manager window 419-3 on the storage management terminal 400. In step P1001, the storage management terminal 400 sends the information to the storage subsystem 100. In step P1002, the CPU 111 of the storage subsystem 100 registers the virtual volume information. In step T1000, the host computer 300 sends a write I/O to a virtual volume. In step T1001, the CPU 111 stores the write I/O data to the Cache Area 112-30. In step T1002, the Cache Area 112-30 stores the data as a dirty cache slot. In step T1010, the CPU 111 finds a dirty cache slot and orders to destage. In step T1011, the Cache Area 112-30 transfers the dirty cache data to disk and changes the cache slot status to clean. In step T1012, the disk 121 stores the received data. In step T1020, the host computer 300 sends a read I/O to a virtual volume and receives data. In step T1021, the CPU 111 searches the cache data, transfers data from disk to cache, and transfers data from cache to host computer 300. In step T1022, the Cache Area 112-30 receives data from the disk 121. In step T1023, the disk 121 sends data to the Cache Area 112-30.

Figure 42:
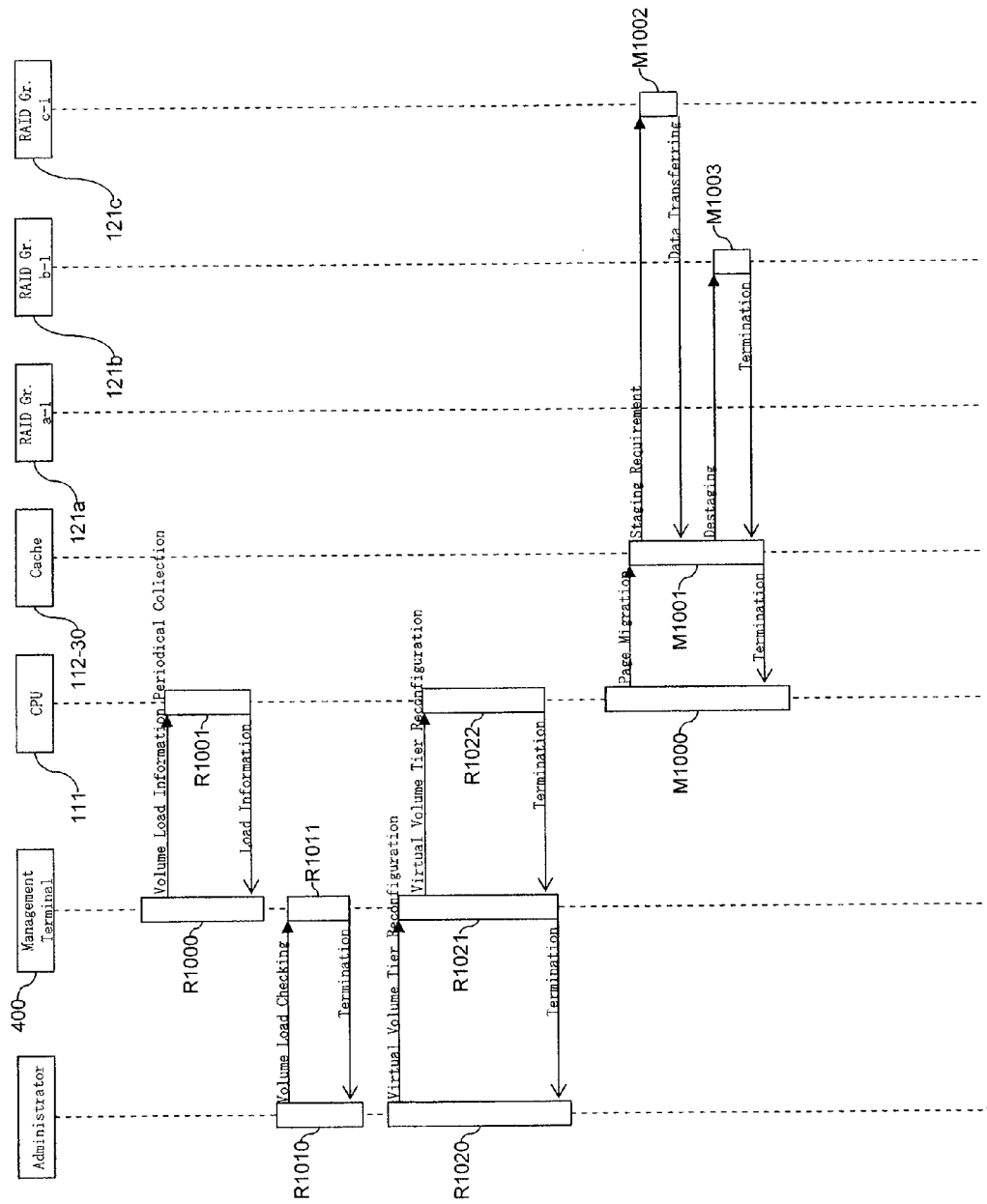
FIG. 42 illustrates an example of a sequence of steps for virtual volume tier reconfiguration.

FIG. 42 illustrates an example of a sequence of steps for virtual volume tier reconfiguration. In step R1000, the storage management terminal 400 requires virtual volume load information to be provided to the storage subsystem 100. In step R1001, the CPU 111 of the storage subsystem 100 sends the virtual volume load information to the storage management terminal 400. In step R1010, the administrator checks the virtual volume load monitor window 419-4 on the storage management terminal 400. In step R1011, the storage management terminal 400 indicates the virtual volume load information to the virtual volume load monitor window 419-4. In step R1020, the administrator changes the tier of a virtual volume with the virtual volume manager window 419-3. In step R1021, the storage management terminal 400 sends the configuration to the storage subsystem 100. In step R1022, the CPU 111 changes the virtual volume tier configuration. In step M1000, the CPU 111 finds a virtual volume page using a capacity pool page in an unmatched tier. The CPU 111 copies the capacity pool page to a newly allocated capacity pool page using the Cache Area 112-30. In step M1001, the Cache Area 112-30 receives data from one disk 121c and transfers it to another disk 121b. In step M1002, the disk 121 sends the data to the Cache Area 112-30. In step M1003, the disk 121 stores the received data from the Cache Area 112-30.

Figure 43:
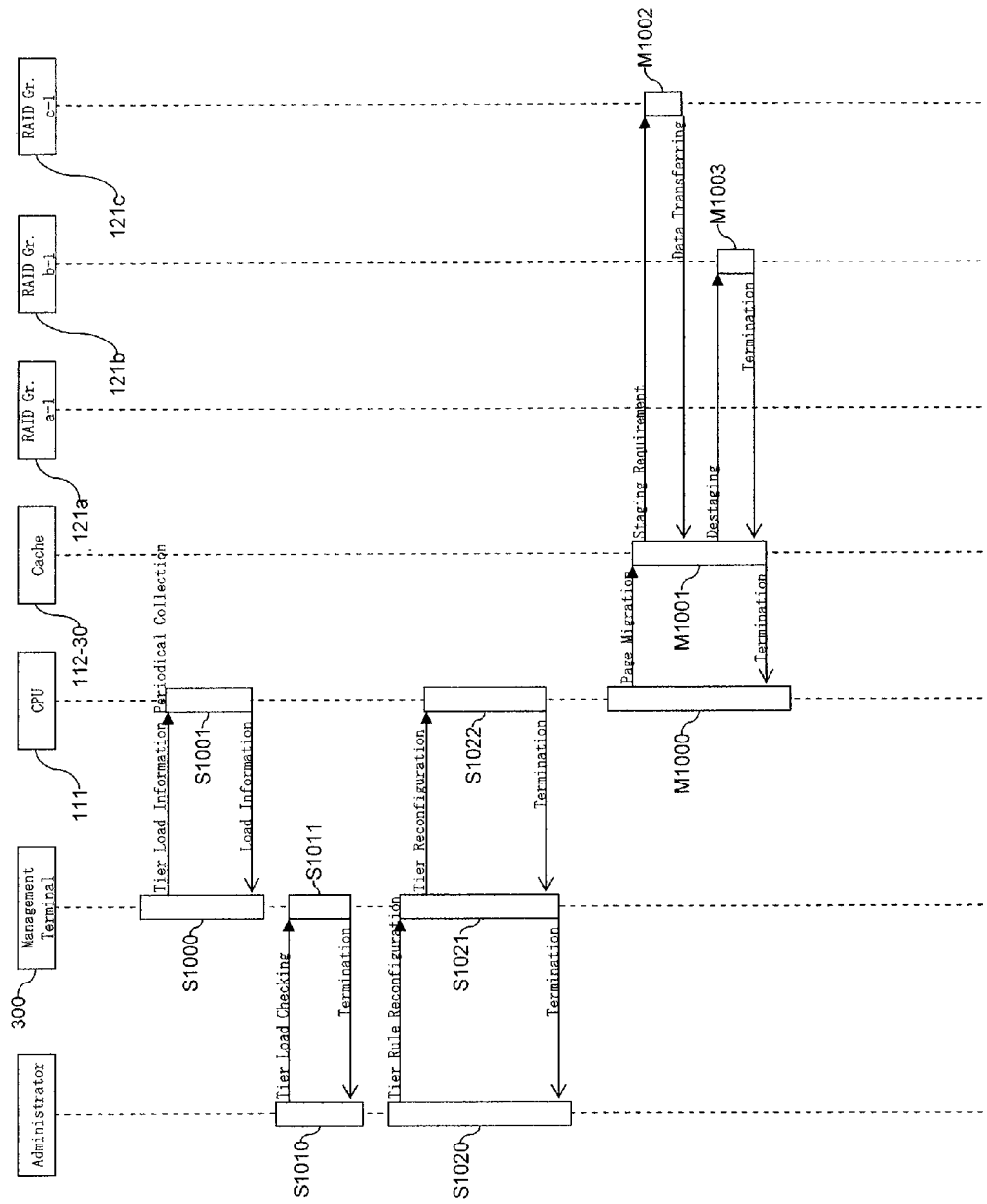
FIG. 43 illustrates an example of a sequence of steps for pool tier reconfiguration.

FIG. 43 illustrates an example of a sequence of steps for pool tier reconfiguration. In step S1000, the storage management terminal 400 requires the tier load information to be provided by the storage subsystem 100. In step S1001, the CPU 111 of the storage subsystem 100 sends the tier load information to the storage management terminal 400. In step S1010, the administrator checks the tier load monitor window 419-5 on the storage management terminal 400. In step S1011, the storage management terminal 400 indicates the tier load information to the tier load monitor window 419-4. In step S1020, the administrator changes the tier configuration rule with the pool manager window 419-2. In step S1021, the storage management terminal 400 sends the configuration to the storage subsystem 100. In step S1022, the CPU 111 changes the tier configuration.

Second Embodiment

FIGS. 44-48 illustrate the second embodiment of the invention. Only the differences with respect to the first embodiment are described.

Figure 44:
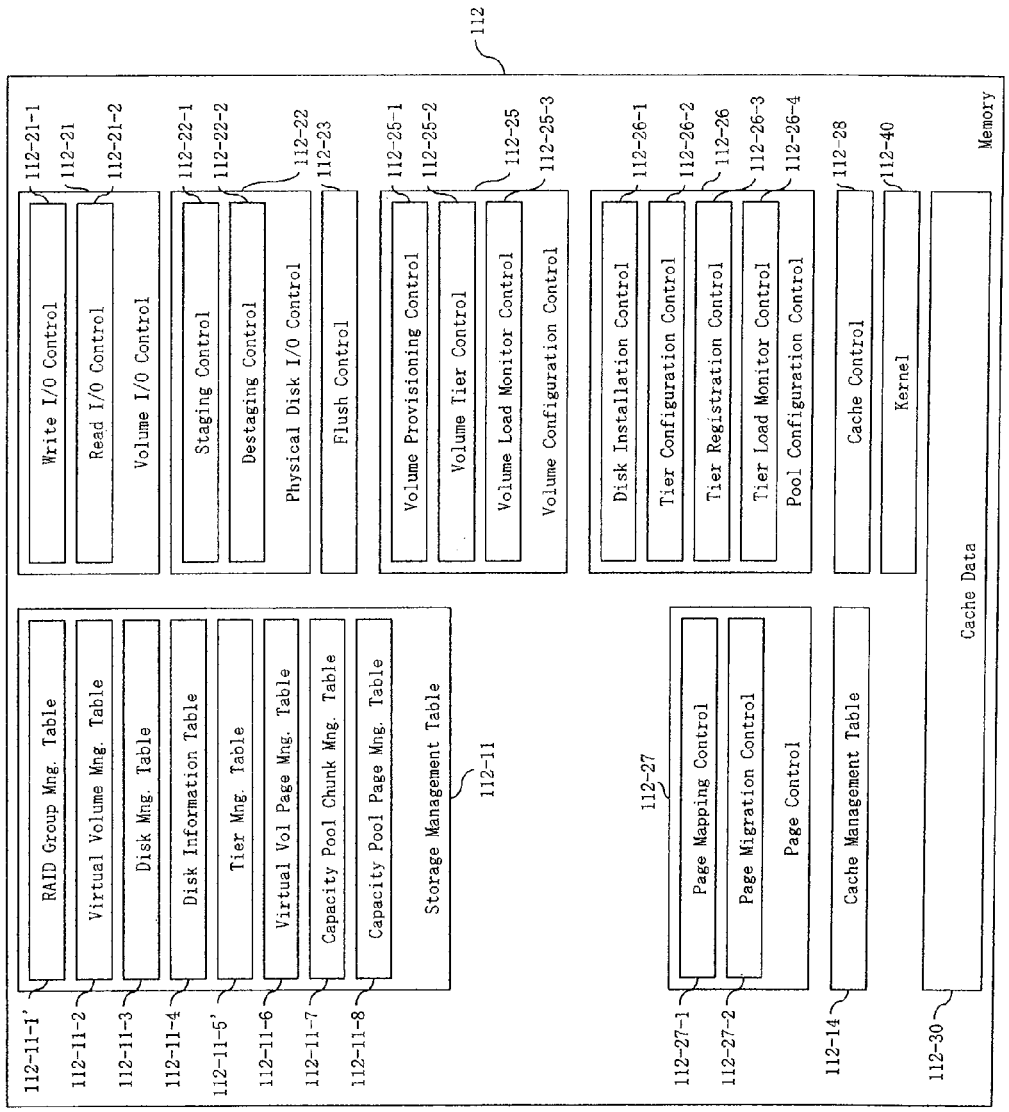
FIG. 44 illustrates an example of a memory in the storage subsystem of FIG. 1 according to a second embodiment of the invention.

In terms of the system configuration, FIG. 44 illustrates an example of a memory 112 in the storage subsystem 100 of FIG. 1 according to the second embodiment of the invention. As compared to FIG. 2 of the first embodiment, the Storage Management Table 112-11 of FIG. 44 has different table structures for the RAID Group Management Table 112-11-1' and Tier Management Table 112-11-5'.

FIG. 45 illustrates an example of the RAID Group Management Table 112-11-1' in the memory of FIG. 44 according to the second embodiment. As compared to FIG. 5 of the first embodiment, a RAID group in the second embodiment can have a plurality of tiers. For a RAID group, the RAID Group Management Table 112-11-1' has multiple rows for the RAID Group Capacity 112-11-1-4' containing the total capacity of the RAID Group except redundant area, for the Tier Number 112-11-1-5' containing the tier number to which the RAID group belongs, the Access Counter 112-11-1-6' containing the access counter to the RAID group, the Free Chunk Queue Index 112-11-1-7' for managing the unused thin provisioning chunks, and the Used Chunk Queue Index 112-11-1-8' for managing the used thin provisioning chunks.

FIG. 46 illustrates an example of the Tier Management Table 112-11-5' in the memory of FIG. 44 according to the second embodiment. As compared to FIG. 7 of the first embodiment, the Tier Management Table 112-11-5' of FIG. 44 has a different column of Configuration Rule 112-11-5-5' containing the configuration rule for grouping the tiers, since a RAID group can have multiple tiers. The RAID groups in the tier match the configuration rule. The configuration rule is based on factors such as area in the disk and reserved capacity, in addition to disk type, disk interface type, performance, RAID level, number of disks, etc.

Figure 47:
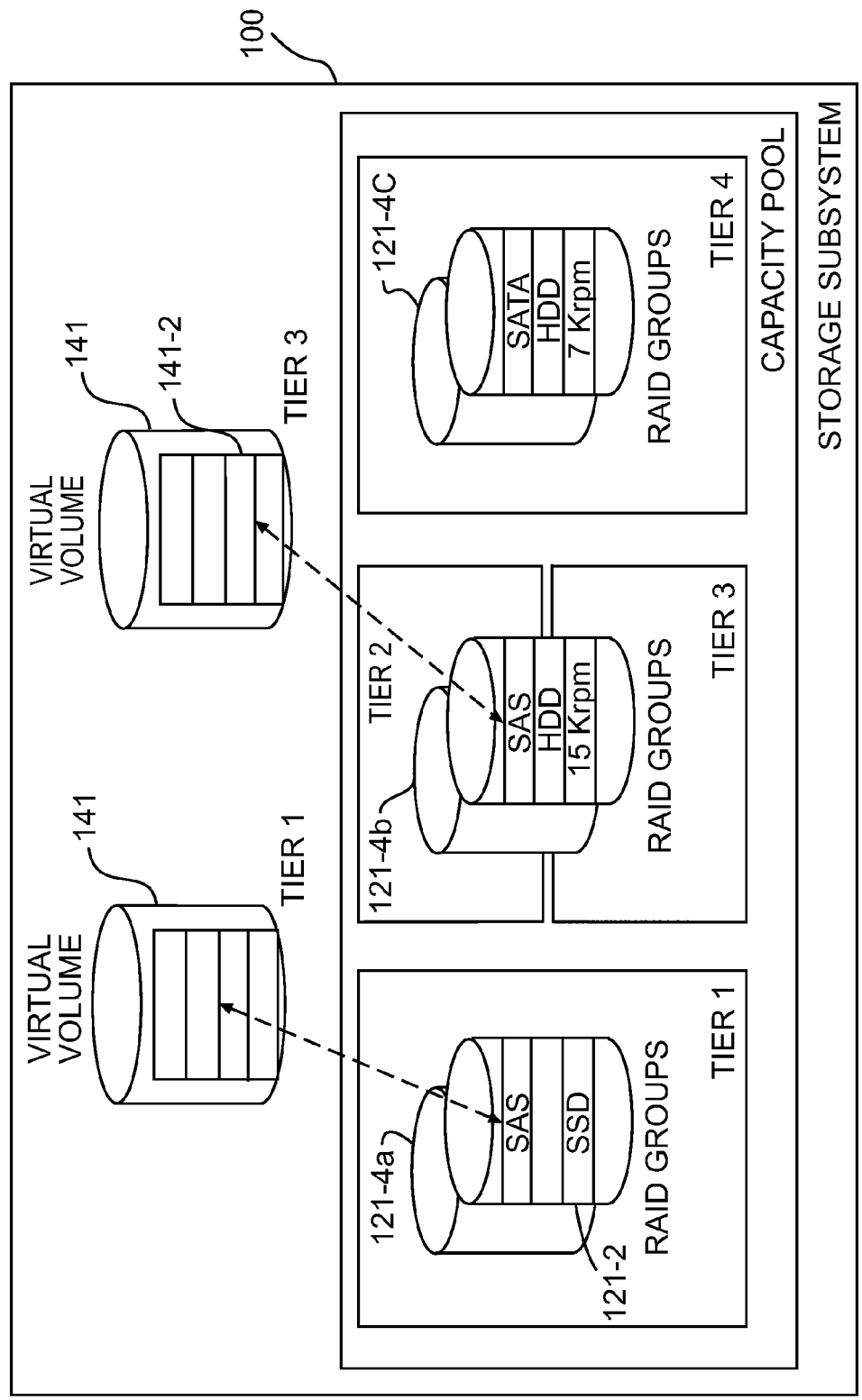
FIG. 47 illustrates a summary of the logical storage configuration of the storage subsystem according to the second embodiment.

In terms of logical structures, FIG. 47 illustrates a summary of the logical storage configuration of the storage subsystem 100 according to the second embodiment. As compared to FIG. 12 of the first embodiment, a RAID group 121-4 of the second embodiment can split into a plurality of tiers. In FIG. 47, one RAID group is split into Tier 2 and Tier 3.

Figure 48:
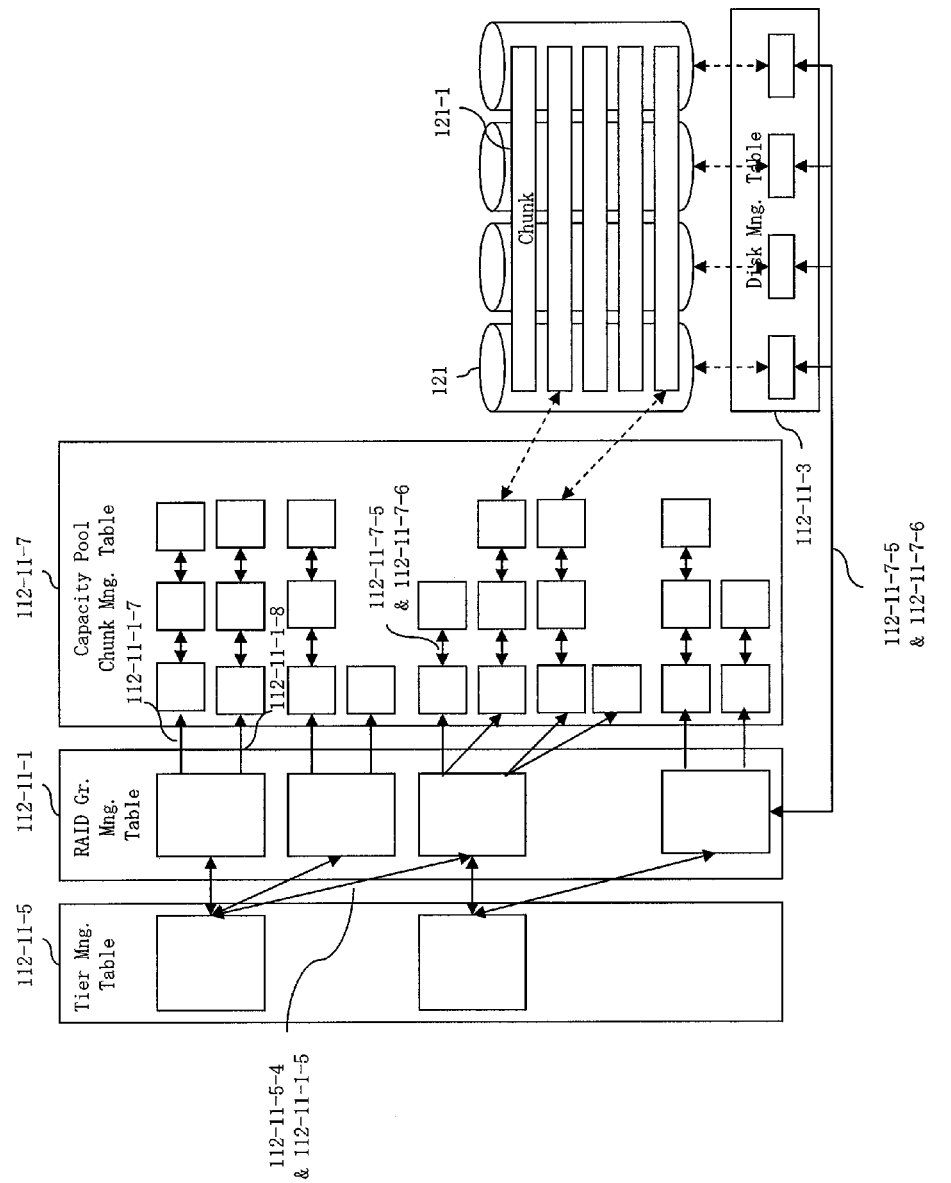
FIG. 48 illustrates an example of the logical structure of a capacity pool chunk according to the second embodiment.

FIG. 48 illustrates an example of the logical structure of a capacity pool chunk according to the second embodiment. As compared to FIG. 14 of the first embodiment, a RAID group in the second embodiment can have multiple tiers. As seen in FIG. 48, the RAID Group Management Table 112-11-1 refers to one or more Tier Management Table 112-11-5', as well as to the Disk Management Tables 112-11-3 of the disks that belong to the group and to the Capacity Pool Chunk Management Table 112-11-7 by Free Chunk Queue 112-11-1-7 and Used Chunk Queue 112-11-1-8.

Third Embodiment

Figure 49:
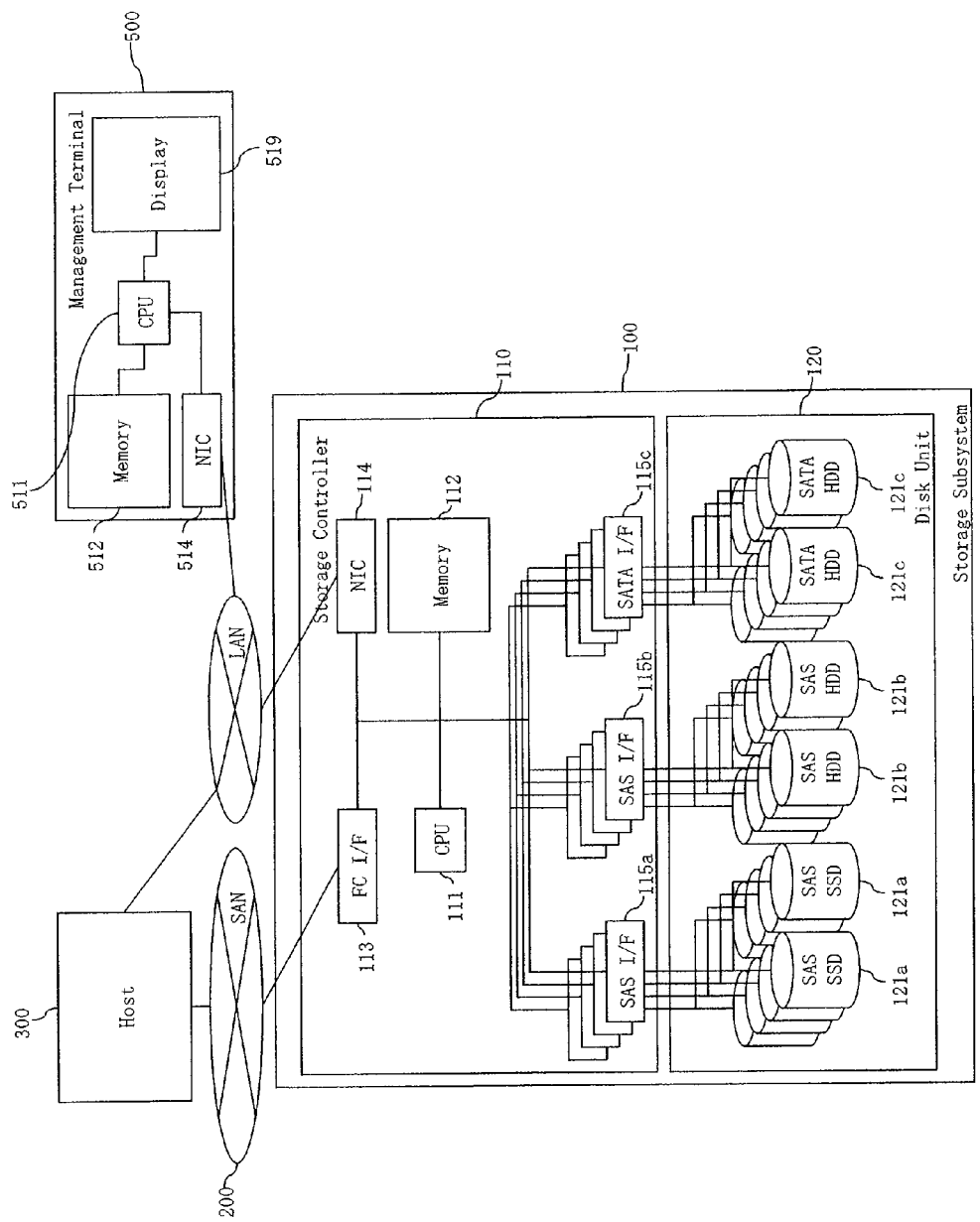
FIG. 49 illustrates the hardware configuration of a system according to a third embodiment in which the method and apparatus of the invention may be applied.

FIG. 49 illustrates the hardware configuration of a system according to a third embodiment in which the method and apparatus of the invention may be applied. Only differences between the third embodiment and the first embodiment are described. In FIG. 49, an additional local network connects the system management terminal 500 with the storage subsystem 100 and the host 300. The system management terminal 500 shows availability/reliability information of the storage subsystem 100 and the host computer 300. The system management terminal 500 includes a CPU 511 that reads programs and tables stored in a memory 512, a local network interface 514 that connects to the local area network, and a display 519 that shows availability/reliability information of the storage subsystem 100.

Figure 50:
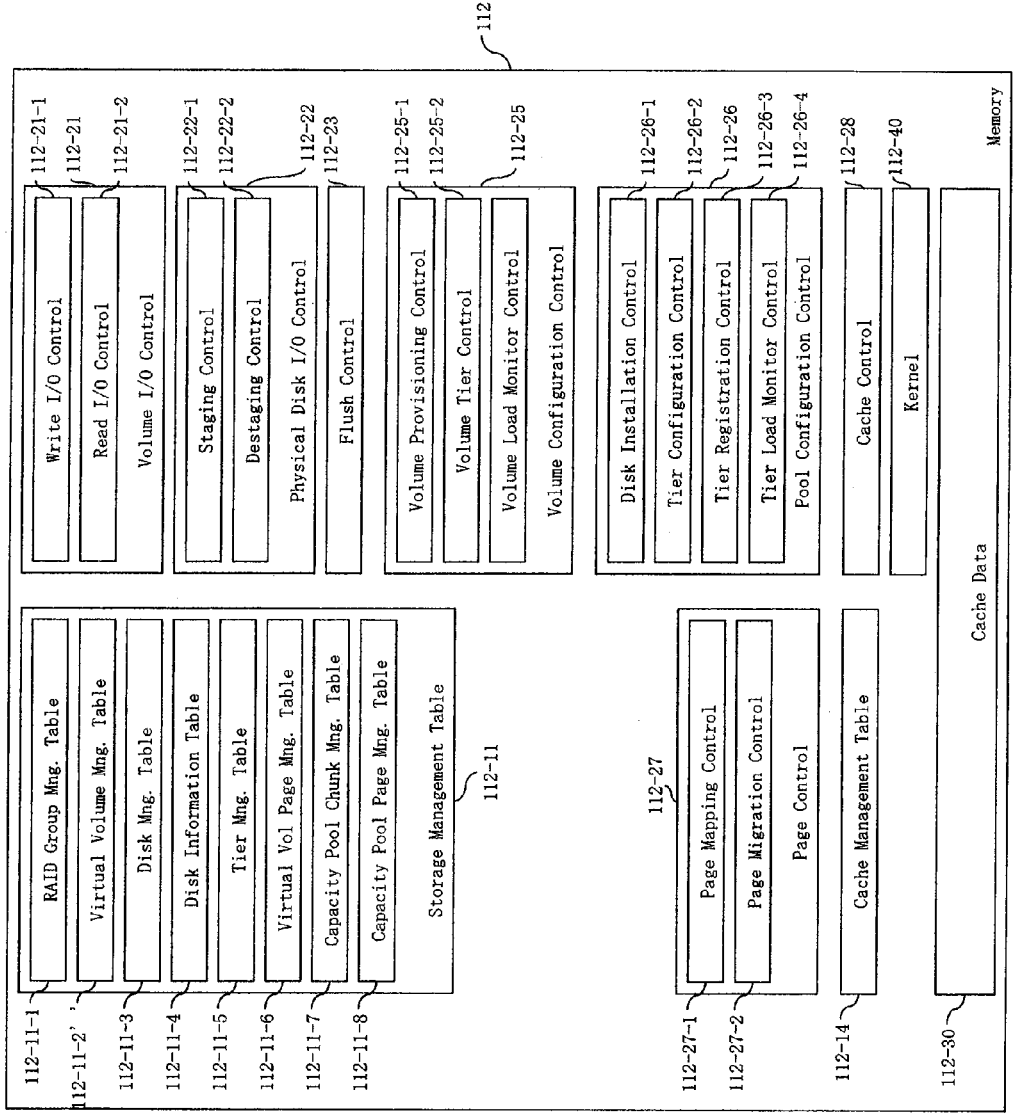
FIG. 50 illustrates an example of a memory in the storage subsystem of FIG. 49 according to the third embodiment.

FIG. 50 illustrates an example of a memory 112 in the storage subsystem 100 of FIG. 49 according to the third embodiment. As compared to FIG. 2 of the first embodiment, the Storage Management Table 112-11 of FIG. 50 has a different Virtual Volume Management Table 112-11-2".

FIG. 51 illustrates an example of the Virtual Volume Management Table 112-11-2" in the memory of FIG. 50 according to the third embodiment. In the third embodiment, a designated area in a virtual volume can set the tier information. As compared to FIG. 6 of the first embodiment, the Virtual Volume Management Table 112-11-2" includes an additional column of Address Range 112-11-2-7" which contains the ranges in a virtual volume. For each range, the Virtual Volume Management Table 112-11-2" includes columns of Using RAID Group Number 112-11-2-3" containing the RAID Group ID which the volume currently uses, Using Chunk Number 112-11-2-5" containing the Chunk ID that the virtual volume currently uses, and Tier Number 112-11-2-6" containing the Tier ID from which the virtual volume allocates a capacity pool page.

Figure 52:
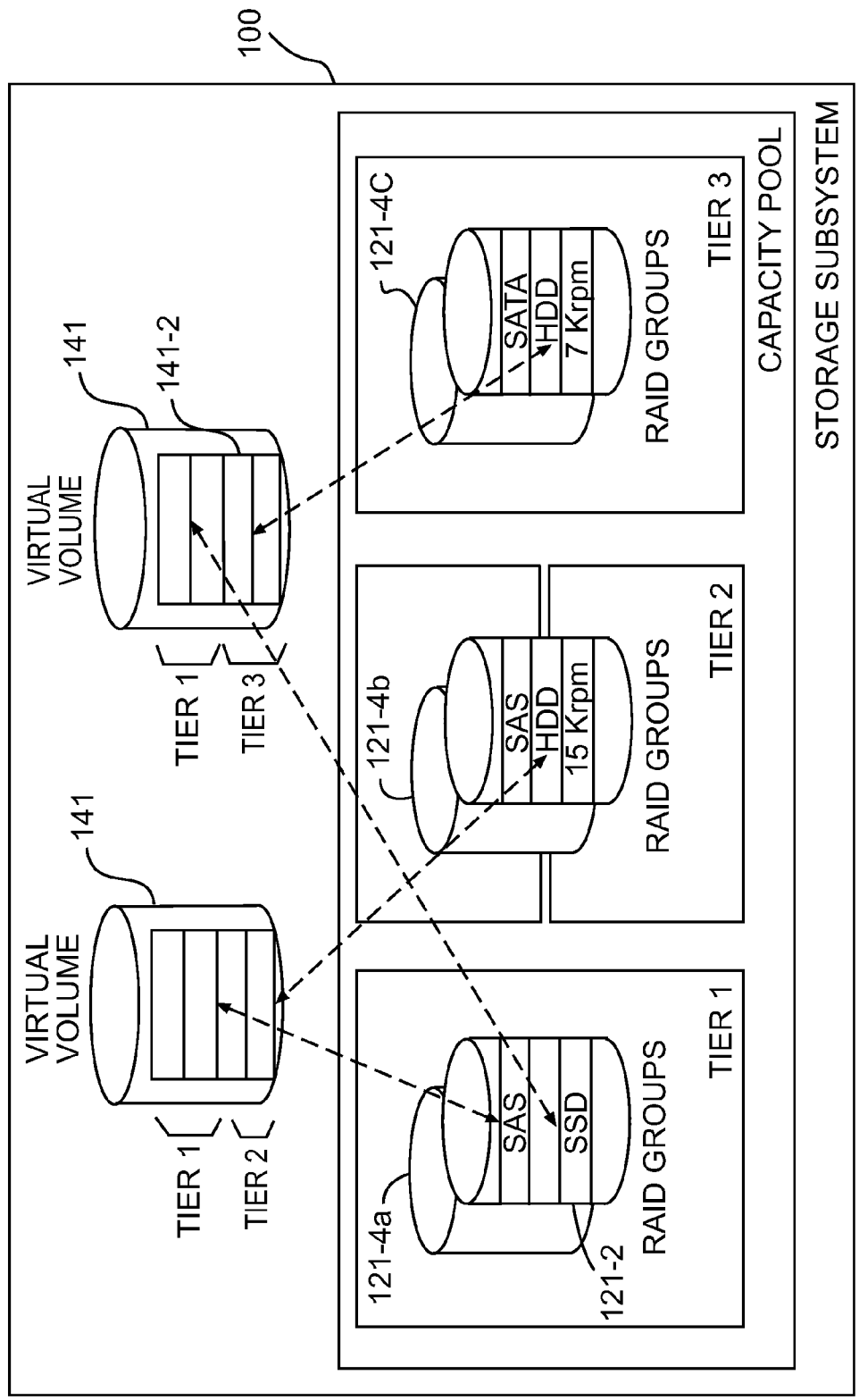
FIG. 52 illustrates a summary of the logical storage configuration of the storage subsystem according to the third embodiment.

In terms of logical structures, FIG. 52 illustrates a summary of the logical storage configuration of the storage subsystem 100 according to the third embodiment. Each designated area in a virtual volume 141 can set the tier. As compared to FIG. 12 of the first embodiment, FIG. 52 shows one virtual volume 141 with Tier 1 and Tier 2 areas, and another virtual volume 141 with Tier 1 and Tier 3 areas.

FIG. 53 illustrates an example of the Application Management Table 512-1 in the memory 512 of the management terminal 500 of FIG. 49 according to the third embodiment. This is a table structure of relation of the application, host and virtual volume area. The Application Management Table 512-1 includes columns of Application Number containing the ID of the application, Host Number containing the ID of a host on which the application is running, Volume Number containing the ID of a virtual volume in which the application data is stored, and Area (e.g., LBA Range of Data) containing the range in which the application data is stored in the virtual volume.

Figure 54:
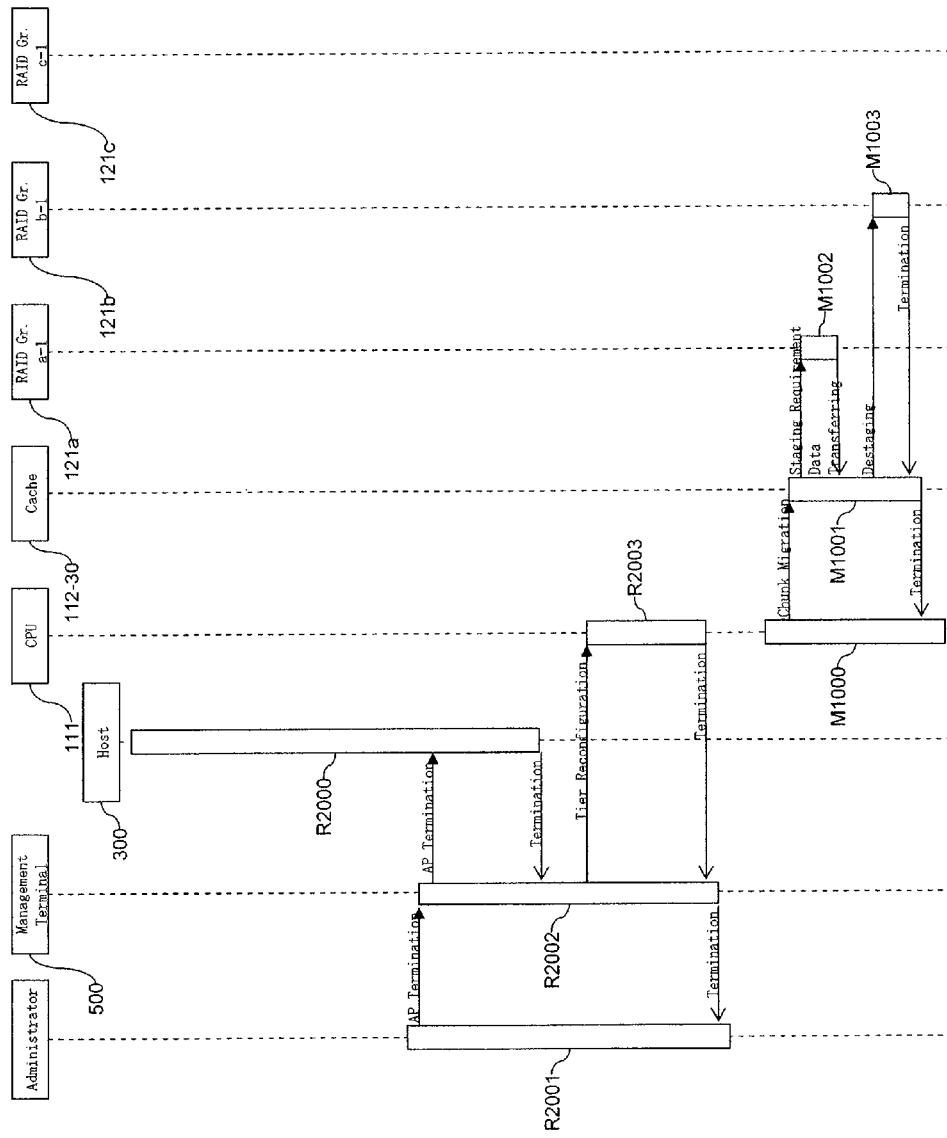
FIG. 54 illustrates an example of a sequence of steps for application operation according to the third embodiment.

In terms of sequences, FIG. 54 illustrates an example of a sequence of steps for application operation according to the third embodiment. In step R2000, the host computer 300 is using an application, and receives termination requirement from the administrator via the system management terminal 500. In step R2001, the administrator requires terminating an application with the system management terminal 500. In step R2002, the system management terminal 500 sends the terminating requirement to the host computer 300, and sends the tier changing requirement to the storage subsystem 100 for the area in which the application data is stored. In step R2003, the CPU 111 of the storage subsystem 100 changes the tier of the designated area in the designated virtual volume.

Fourth Embodiment

1. Hardware

Figure 55:
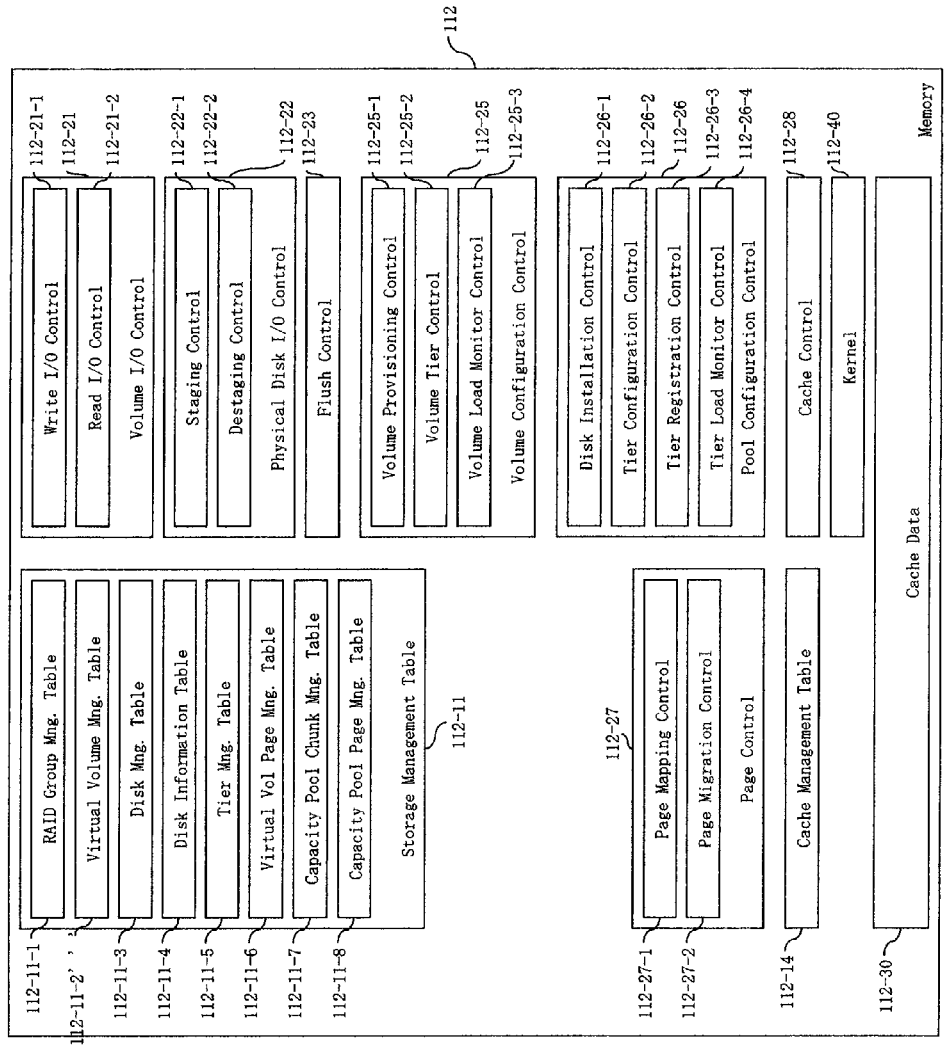
FIG. 55 illustrates an example of a memory in the storage subsystem of FIG. 1 according to a fourth embodiment of the invention.

FIG. 55 illustrates an example of a memory in the storage subsystem of FIG. 1 according to a fourth embodiment of the invention. Only differences between the fourth embodiment and the first embodiment are described. In FIG. 55, the Storage Management Table 112-11 has a Virtual Volume Management Table 112-11-2'''.

2. Table Structure

FIG. 56 illustrates an example of a Virtual Volume Management Table 112-11-2''' in the memory of FIG. 55. As compared to the Virtual Volume Management Table of FIG. 51, the column of Address Range 112-11-2-7" is eliminated and a column of Transaction Condition 112-11-2-8''' is added. The Transaction Condition column 112-11-2-8''' provides the tier condition for the page belonging to the virtual volume (designated area). If "N/A" is stored to an entry in this column, it means that the tier is unused for the virtual volume. The designated area in a virtual volume can set the tier information.

3. Human Interface

Figure 57:
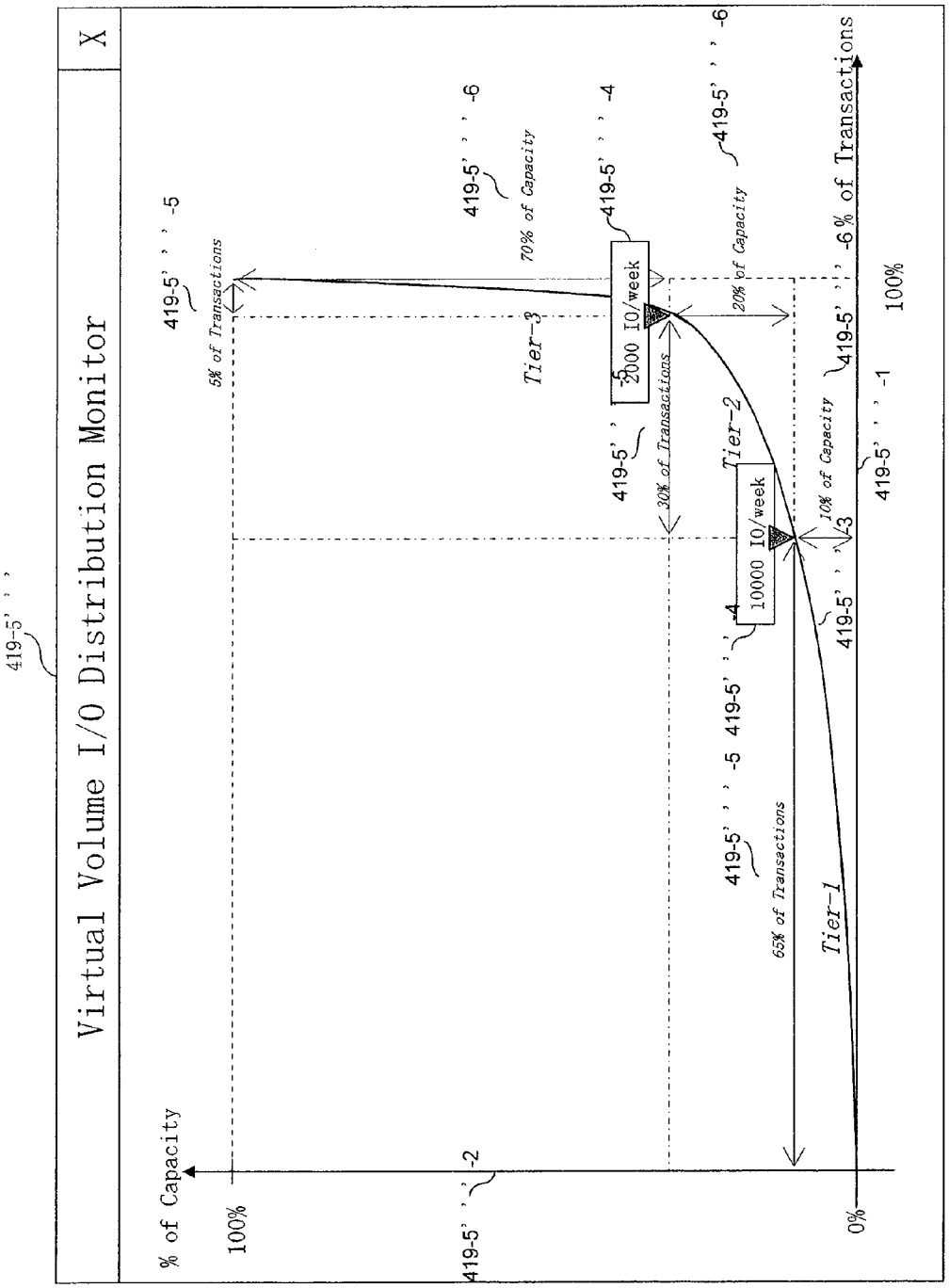
FIG. 57 illustrates an example of a display and an operation image of RAID group installation.

FIG. 57 illustrates an example of a display and an operation image of RAID group installation. A Virtual Volume I/O Distribution Monitor 419-5''' shows I/O locality information using a "Lorenz Curve" graph. The X-Axis 419-5'''-1 of the graph represents "% of transactions" for the virtual volume. The Y-Axis 419-5'''-2 of the graph represents "% of capacity" for the capacity-allocated virtual volume area. The Cumulative Distribution Curve 419-5'''-3 is the "Lorenz Curve" that shows I/O locality. Points 419-5'''-4 show I/O amounts of designated points on the Lorenz Curve. The Involved Transaction Rate Information 419-5'''-5 is the transaction rate difference of two Points 419-5'''-4, which means possibility transaction amount by a tier. The Involved Capacity Rate Information 419-5'''-6 is the capacity rate difference of two Points 419-5'''-4, which means required capacity for a tier to cover the transaction amount of Involved Transaction Rate Information 419-5'''-5.

Figure 58:
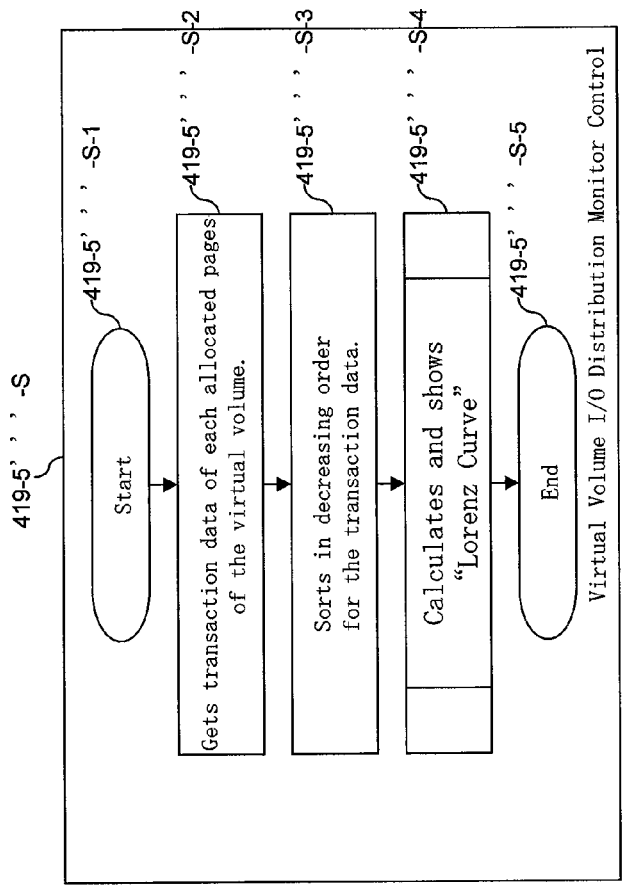
FIG. 58 shows an example of a flow diagram for indicating the Virtual Volume I/O Distribution Monitor.

FIG. 58 shows an example of a flow diagram for indicating the Virtual Volume I/O Distribution Monitor 419-5'''. The program starts in step 419-5'''-S-1. In step 419-5'''-S-2, the program receives transaction counter data from the Virtual Volume Page Management Table 112-11-6 of the storage subsystem 100. In step 419-5'''-S-3, the program sorts the received transaction data in decreasing order. In step 419-5'''-S-4, the program calculates the cumulative distribution by using Formula 419-5'''-F-2 and 419-5'''-F-3 in FIG. 59 and indicates the result to the monitor 419. The program ends in step 419-5'''-S-5.

FIG. 59 shows the formulas to calculate the Lorenz Curve. Formula 419-5'''-F-1 is the basic formula for the Lorenz Curve. Formula 419-5'''-F-2 sets forth the x data using j as an intermediate variable. This value means the transaction amount rate of summation from $T_0$ to $T_j$. Formula 419-5'''-F-3 sets forth the y data using j as an intermediate variable. This value means the capacity amount rate of summation from $T_0$ to $T_j$. Function 419-5'''-V-1 is the function of Lorentz Curve. Variable 419-5'''-V-2 is the y value in relation to $x_j$. Variable 419-5'''-V-3 is the $x_j$ value. Variable 419-5'''-V-4 is the total number of allocated pages in the virtual volume. Variables 419-5'''-V-5 are intermediate variables that mean ID of a page. Variable 419-5'''-V-6 is the transaction amount of page j.

4. Sequence

Figure 60:
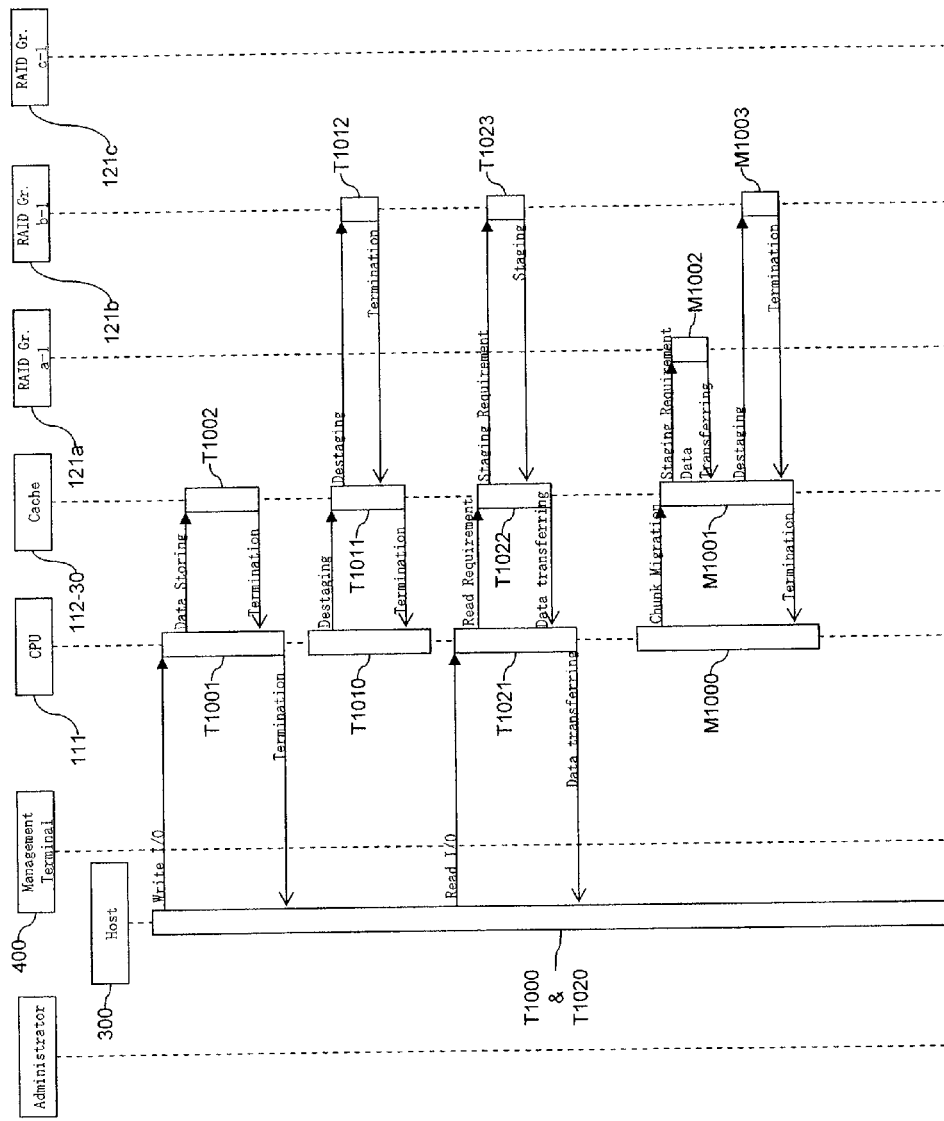
FIG. 60 illustrates an example of a sequence of steps for application operation.

FIG. 60 illustrates an example of a sequence of steps for application operation. Tier changing is automatically operated by the storage subsystem 100 without the user and host computer 300 interventions. Steps T1001 to T1023 are the same as those in FIG. 41. Steps M1000 to M1003 involve chunk migration, and are similar to those in FIG. 43 involving page migration.

From the foregoing, it will be apparent that the invention provides methods, apparatuses and programs stored on computer readable media for dynamic page reallocation storage system management. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A storage system for storage management in a tiered storage environment, the storage system comprising:
a plurality of storage volumes in a pool which are divided into a plurality of tiers having different tier levels, the tiers being organized according to a tier configuration rule, the plurality of storage volumes provided by a plurality of physical storage devices in the storage system;
a controller controlling the plurality of physical storage devices, the controller including a processor and a memory, the controller changing tier configurations of the tiers of storage volumes when the tier configuration rule is changed, the tier configurations including the tier levels;
wherein the controller allocates the pool to a plurality of virtual volumes based on a change of tier levels against the physical storage devices which occurs when the pool does not meet the tier configuration rule that was in effect;
wherein the pool includes a plurality of thin provisioning pools; and
wherein the controller receives an input to allocate two or more of the thin provisioning pools to one virtual volume and merges the two or more thin provisioning pools into a consolidated thin provisioning pool to be allocated to the one virtual volume.

2. A storage system according to claim 1,
wherein each tier in the pool includes one or more RAID groups of the physical storage devices.

3. A storage system according to claim 1,
wherein the plurality of physical storage devices are arranged into a plurality of RAID groups in the pool which are divided into the plurality of tiers, and
wherein at least one RAID group in the pool includes physical storage devices that are split among two or more of the plurality of tiers.

4. A storage system according to claim 1,
wherein the controller allocates the pool to the plurality of virtual volumes based on a change of tier levels against the physical storage devices in response to an input from a management terminal when the pool does not meet the tier configuration rule that was in effect.

5. A storage system according to claim 1,
wherein at least one virtual volume of the plurality of virtual volumes has one or more designated areas that are capable of setting the tier level therein in accordance with changing tier configurations by the controller.

6. A storage system according to claim 1,
wherein the controller allocates the pool to the plurality of virtual volumes based on a change of tier levels against the physical storage devices which occurs automatically without external input when the pool does not meet the tier configuration rule that was in effect.

7. A storage system according to claim 1,
wherein the controller monitors a tier load of the storage system, and allocates the pool to the plurality of virtual volumes based on the change of tier levels against the physical storage devices as determined based on the tier load of the storage system.

8. A storage system for storage management in a tiered storage environment, the storage system comprising:
a plurality of storage volumes in a pool which are divided into a plurality of tiers having different tier levels, each tier being organized according to a tier configuration rule, the plurality of storage volumes provided by a plurality of physical storage devices in the storage system;
a controller controlling the plurality of physical storage devices, the controller including a processor and a memory, the controller changing tier configurations of the tiers of storage volumes when the tier configuration rule is changed, the tier configurations including the tier levels;
wherein the controller dynamically allocates the pool to a plurality of virtual volumes based on a change of tier levels against the physical storage devices;
wherein the plurality of physical storage devices are arranged into a plurality of RAID groups in the pool which are divided into the plurality of tiers; and
wherein at least one RAID group in the pool includes physical storage devices that are split among two or more of the plurality of tiers;
wherein the pool includes a plurality of thin provisioning pools; and
wherein the controller receives an input to allocate two or more of the thin provisioning pools to one virtual volume and merges the two or more thin provisioning pools into a consolidated thin provisioning pool to be allocated to the one virtual volume.

9. A storage system according to claim 8,
wherein the controller allocates the pool to the plurality of virtual volumes based on a change of tier levels against the physical storage devices in response to an input from a management terminal when the pool does not meet the tier configuration rule that was in effect.

10. A storage system according to claim 8,
wherein at least one virtual volume of the plurality of virtual volumes has one or more designated areas that are capable of setting the tier level therein in accordance with changing tier configurations by the controller.

11. A storage system according to claim 8,
wherein the controller allocates the pool to the plurality of virtual volumes based on a change of tier levels against the physical storage devices which occurs automatically without external input when the pool does not meet the tier configuration rule that was in effect.

12. A storage system according to claim 8,
wherein the controller monitors a tier load of the storage system, and allocates the pool to the plurality of virtual volumes based on the change of tier levels against the physical storage devices as determined based on the tier load of the storage system.

13. A storage system for storage management in a tiered storage environment, the storage system comprising:
a plurality of storage volumes in a pool which are divided into a plurality of tiers having different tier levels, each tier being organized according to a tier configuration rule, the plurality of storage volumes provided by a plurality of physical storage devices in the storage system;
a controller controlling the plurality of physical storage devices, the controller including a processor and a memory, the controller changing tier configurations of the tiers of storage volumes when the tier configuration rule is changed, the tier configurations including the tier levels;
wherein the controller allocates the pool to a plurality of virtual volumes based on the tier configuration rule and characteristics of the virtual volumes;
wherein the pool includes a plurality of thin provisioning pools; and
wherein the controller receives an input to allocate two or more of the thin provisioning pools to one virtual volume and merges the two or more thin provisioning pools into a consolidated thin provisioning pool to be allocated to the one virtual volume.

14. A storage system according to claim 13,
wherein the controller allocates the pool to the plurality of virtual volumes based on a change of tier levels against the physical storage devices in response to an input from a management terminal when the pool does not meet the tier configuration rule that was in effect.

15. A storage system according to claim 13, wherein the controller dynamically allocates the pool to a plurality of virtual volumes based on a change of tier levels against the physical storage devices.

16. A storage system according to claim 13, wherein at least one virtual volume of the plurality of virtual volumes has one or more designated areas that are capable of setting the tier level therein in accordance with changing tier configurations by the controller.

17. A storage system according to claim 13, wherein the controller allocates the pool to the plurality of virtual volumes based on a change of tier levels against the physical storage devices which occurs automatically without external input when the pool does not meet the tier configuration rule that was in effect.

18. A storage system according to claim 13, wherein the controller monitors a tier load of the storage system, and allocates the pool to the plurality of virtual volumes based on the change of tier levels against the physical storage devices as determined based on the tier load of the storage system.

* * * * *